United States Patent
Xu et al.

(10) Patent No.: US 10,931,963 B2
(45) Date of Patent: Feb. 23, 2021

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US); Stephan Wenger, Hillsborough, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/147,195

(22) Filed: Sep. 28, 2018

(65) Prior Publication Data

US 2019/0182502 A1    Jun. 13, 2019

Related U.S. Application Data

(60) Provisional application No. 62/595,939, filed on Dec. 7, 2017.

(51) Int. Cl.
*H04N 19/513* (2014.01)
*H04N 19/176* (2014.01)
*H04N 19/70* (2014.01)
*H04N 19/52* (2014.01)

(52) U.S. Cl.
CPC ......... *H04N 19/513* (2014.11); *H04N 19/176* (2014.11); *H04N 19/52* (2014.11); *H04N 19/70* (2014.11)

(58) Field of Classification Search
CPC .............................. H04N 7/183; G07C 9/00896
See application file for complete search history.

(56) References Cited

U.S. PATENT DOCUMENTS

| 8,526,495 | B2 | 9/2013 | Liu et al. | |
|---|---|---|---|---|
| 9,049,452 | B2 | 6/2015 | Liu et al. | |
| 9,510,012 | B2 | 11/2016 | Liu et al. | |
| 9,813,726 | B2 | 11/2017 | Liu et al. | |
| 2005/0053296 | A1* | 3/2005 | Srinivasan ........... | H04N 19/176 382/236 |
| 2012/0207216 | A1* | 8/2012 | Yu ........................ | H04N 19/147 375/240.12 |
| 2013/0343664 | A1* | 12/2013 | Kobayashi ........... | H04N 19/139 382/233 |

(Continued)

OTHER PUBLICATIONS

"High efficiency video coding", Recommendation ITU-T H.265 V4, International Telecommunication Union, Dec. 2016, 669 Pages.
Xiaozhong Xu, et al., "Non-CE2: Intra BC merge mode with default candidates", JCTVC-S0123, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-7.

(Continued)

*Primary Examiner* — Jonathan R Messmore
(74) *Attorney, Agent, or Firm* — Oblon, McClelland, Maier & Neustadt, L.L.P.

(57) ABSTRACT

Aspects of the disclosure provide methods and a decoder device for video decoding. In some embodiments, the decoder device for video decoding includes processing circuitry. The processing circuitry selects a motion vector of a neighboring sub-block that is a neighbor of a current block under reconstruction. The current block is in a coded picture that is a part of a coded video bitstream. The processing circuitry determines, from the motion vector, motion vector predictors for a plurality of sub-blocks included in the current block. The neighboring sub-block and the plurality of sub-blocks are in a first one of a single row and a single column of the coded picture.

22 Claims, 18 Drawing Sheets

(56) References Cited

U.S. PATENT DOCUMENTS

| | | | | |
|---|---|---|---|---|
| 2014/0023144 A1* | 1/2014 | Park | .................... | H04N 19/56 |
| | | | | 375/240.16 |
| 2014/0161189 A1* | 6/2014 | Zhang | ................ | H04N 19/597 |
| | | | | 375/240.16 |
| 2015/0373340 A1* | 12/2015 | Zou | .................... | H04N 19/176 |
| | | | | 375/240.24 |
| 2016/0323573 A1* | 11/2016 | Ikai | .................... | H04N 19/597 |
| 2016/0366415 A1* | 12/2016 | Liu | .................... | H04N 19/463 |
| 2016/0366439 A1* | 12/2016 | Pu | .................... | H04N 19/593 |
| 2017/0332093 A1* | 11/2017 | Merkle | ................ | H04N 19/52 |
| 2018/0084260 A1* | 3/2018 | Chien | ................ | H04N 19/105 |
| 2019/0141318 A1* | 5/2019 | Li | .................... | H04N 19/159 |
| 2019/0230374 A1* | 7/2019 | Yao | .................... | H04N 19/593 |

OTHER PUBLICATIONS

Xiaozhong Xu, et al., "CE2 Test 3.2: Intra BC merge mode with default candidates", JCTVC-T0073, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-6.

Shan Liu, et al., "Non-Linear Motion-compensated Interpolation for Low Bit Rate Video", Integrated Media Systems Center and Department of Electrical Engineering-Systems, University of Southern California, 2000, 11 Pages.

Shan Liu, et al., "MCI-embedded Motion Compensated Prediction for Quality", Proc. SPIE vol. 4209, Integrated Media Systems Center and Electrical Engineering-Systems, University of Southern California, pp. 251-261.

* cited by examiner

METHOD AND APPARATUS FOR VIDEO CODING

INCORPORATION BY REFERENCE

This application claims the benefit of priority from U. S. Provisional Application No. 62/595,939, filed on Dec. 7, 2017, which is hereby incorporated by reference herein in its entirety.

TECHNICAL FIELD

The disclosed subject matter relates to video coding and decoding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be directed from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and a decoder device for video decoding. In some embodiments, the decoder device for video decoding includes processing circuitry. The processing circuitry selects a motion vector of a neighboring sub-block that is a neighbor of a current block under reconstruction. The current block is in a coded picture that is a part of a coded video bitstream. The processing circuitry determines, from the motion vector, motion vector predictors for a plurality of sub-blocks included in the current block. The neighboring sub-block and the plurality of sub-blocks are in a first one of a single row and a single column of the coded picture.

In an embodiment, the neighboring sub-block and the plurality of sub-blocks are in the single column of the coded picture, and the neighboring sub-block is a top neighbor above the plurality of sub-blocks.

In an embodiment, the neighboring sub-block and the plurality of sub-blocks are in the single row of the coded picture, and the neighboring sub-block is a left neighbor of the plurality of sub-blocks.

In an embodiment, a motion vector predictor for each remaining sub-block included in the current block is determined from a motion vector of a neighboring sub-block that is a neighbor of the current block and included in one of a single row and a single column with the respective remaining sub-block that is parallel to the first one of the single row and the single column.

In an example, the processing circuitry decodes a codeword from the coded video bitstream. The codeword indicates the first one of the single row and the single column.

In an embodiment, the processing circuitry decodes, from the coded video bitstream, a residual motion vector for one of the plurality of sub-blocks. The processing circuitry combines the motion vector predictor for the one of the plurality of sub-blocks with the residual motion vector to derive a motion vector for the one of the plurality of sub-blocks. In an example, the derived motion vector is used to determine motion vectors for the remaining sub-blocks of the plurality of sub-blocks.

In an example, the processing circuitry decodes at least one syntax element from the coded video bitstream. The at least one syntax element indicates the first one of the single row and the single column.

In an example, the processing circuitry determines motion vectors for the plurality of sub-blocks based on the motion vector predictors and using one of: template matching and bilateral matching.

In an example, the processing circuitry selects another motion vector of another neighboring sub-block that is a neighbor of the current block. The processing circuitry determines, from the other motion vector, another motion vector predictor for one of the plurality of sub-blocks. The other neighboring sub-block and the one of the plurality of sub-blocks are in a second one of a single row and a single column of the coded picture. The second one of the single row and the single column is perpendicular to the first one of the single row and the single column. The processing circuitry determines a motion vector for the one of the plurality of sub-blocks based on the motion vector predictor and the other motion vector predictor of the one of the plurality of sub-blocks. In an example, the processing circuitry determines the motion vector for the one of the plurality of sub-blocks using a weighted combination of the motion vector predictor and the other motion vector predictor for the one of the plurality of sub-blocks.

Aspects of the disclosure also provide a non-transitory computer-readable storage medium storing a program executable by at least one processor for video decoding to perform any of the methods for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Embodiments of the present disclosure are directed to reducing redundancy in motion vector coding.

Figure 1:
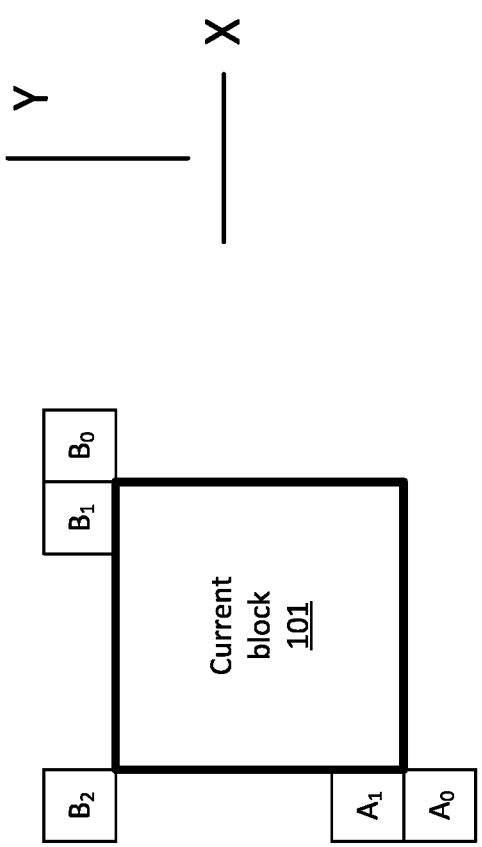
FIG. 1 is a schematic illustration of a current block and its surrounding spatial merge candidates in accordance with H.265.
Figure 2:
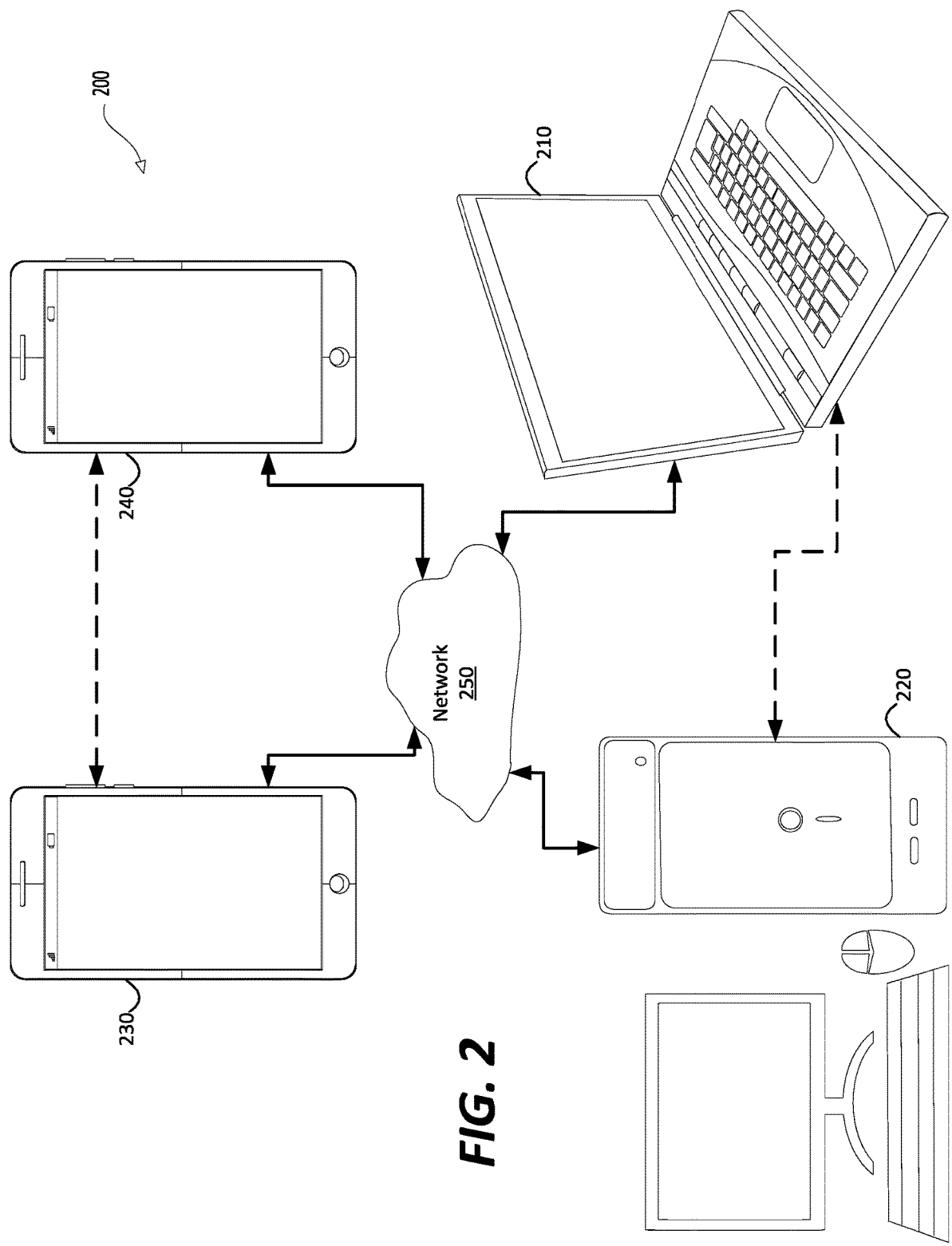
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
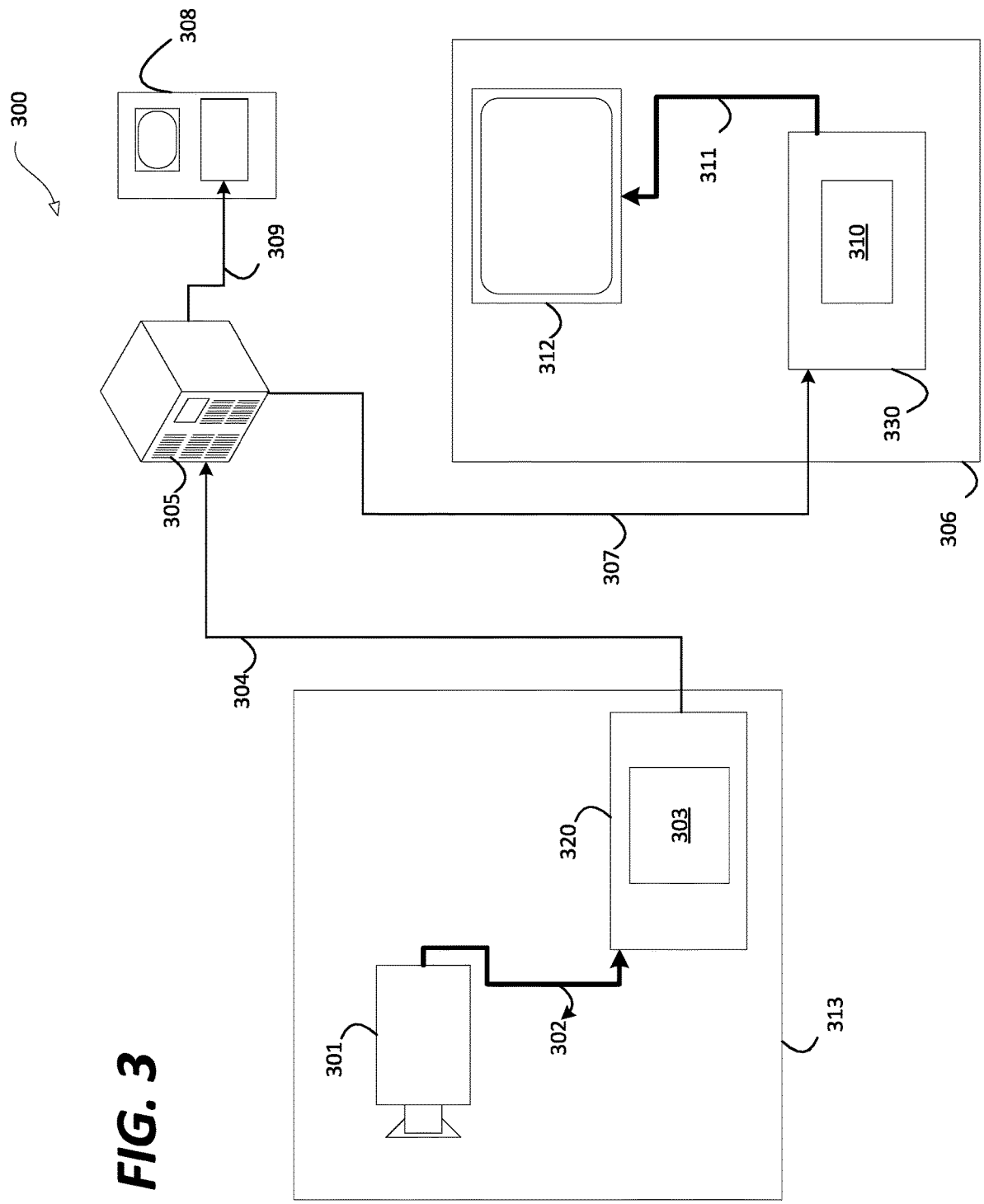
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
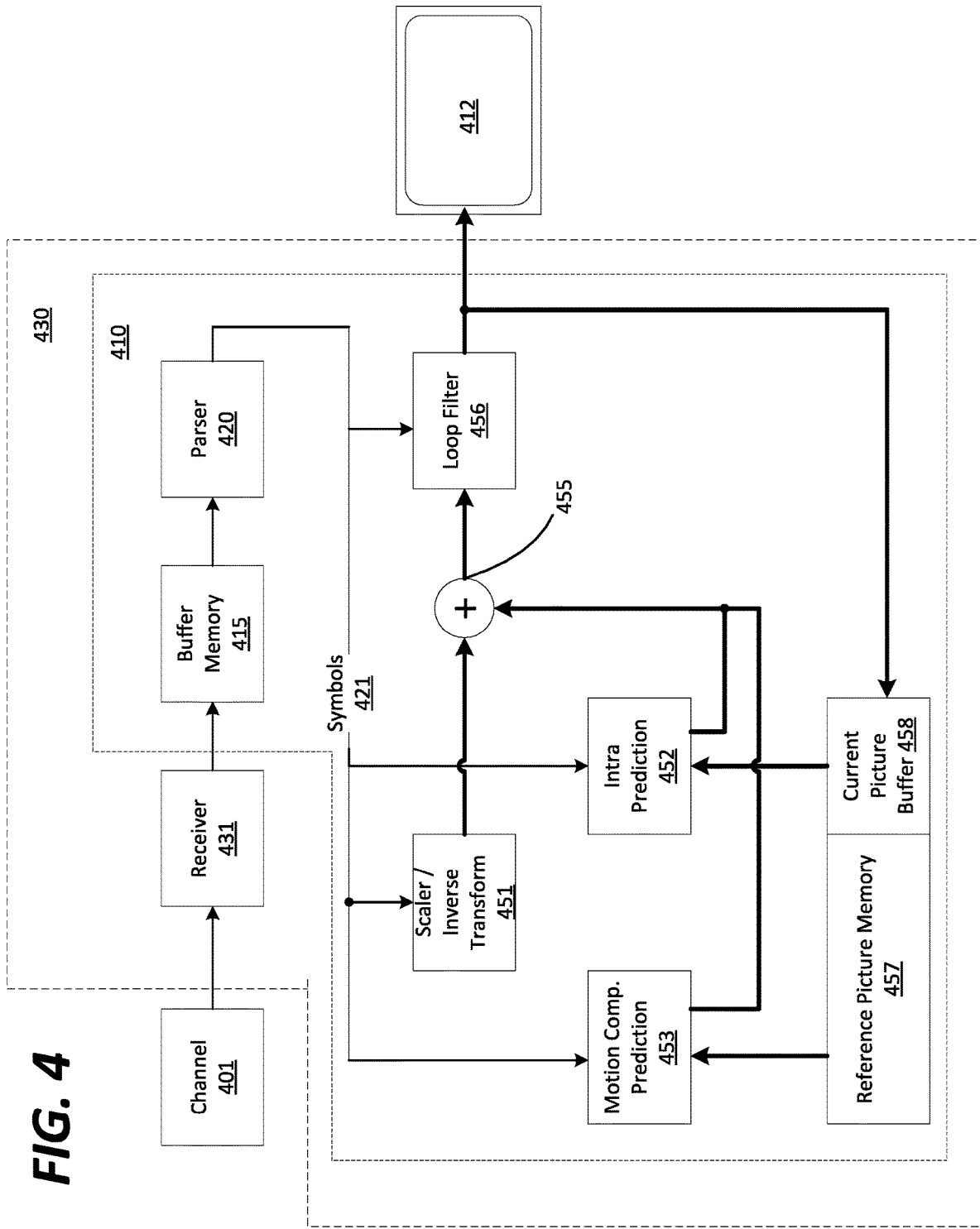
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
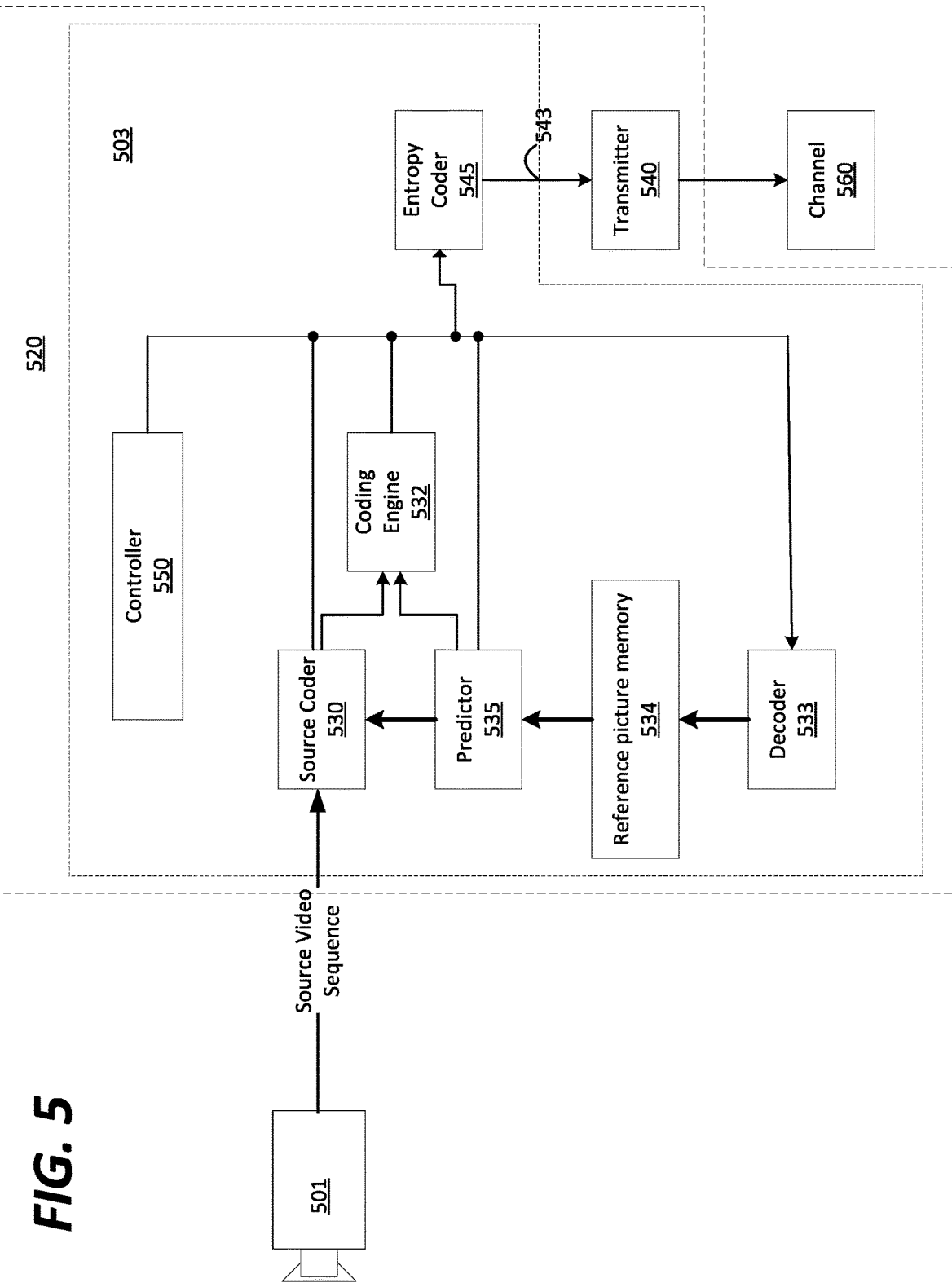
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501)(that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except, for example, the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/ SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency. In various embodiments, in the merge mode, a block in the current picture can inherit motion vectors of a neighboring block (e.g., that shares a boundary with the block, is disposed in a larger partition region with the block) in the current picture.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 6:
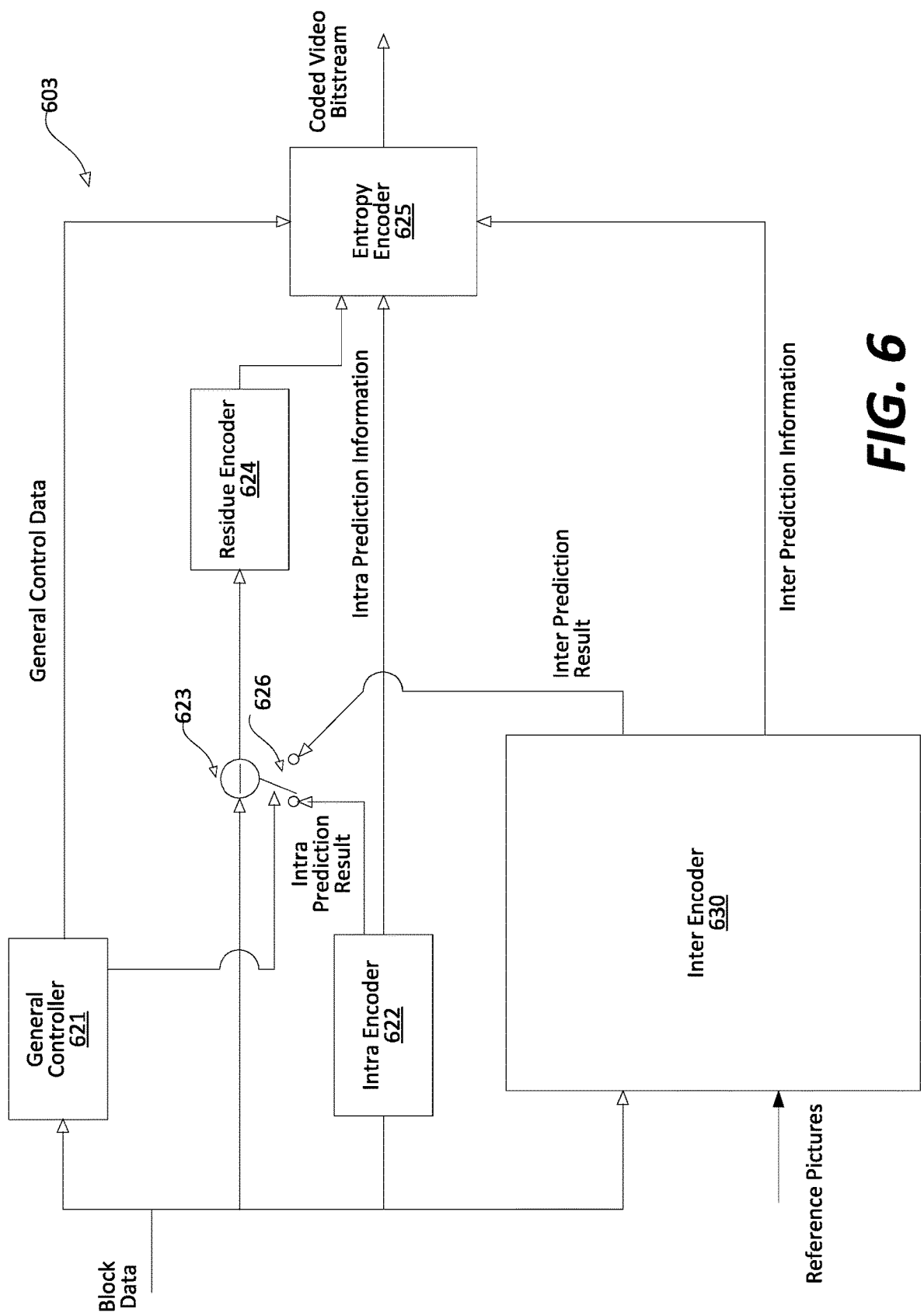
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (622) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (621) is configured to determine general control data and control other components of the video encoder (603) based on the general control data. In an example, the general controller (621) determines the mode of the block, and provides a control signal to the switch (626) based on the mode. For example, when the mode is the intra, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients.

The entropy encoder (625) is configured to format the bitstream to include the encoded block. The entropy encoder (625) is configured to include various information according to a suitable standard, such as HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
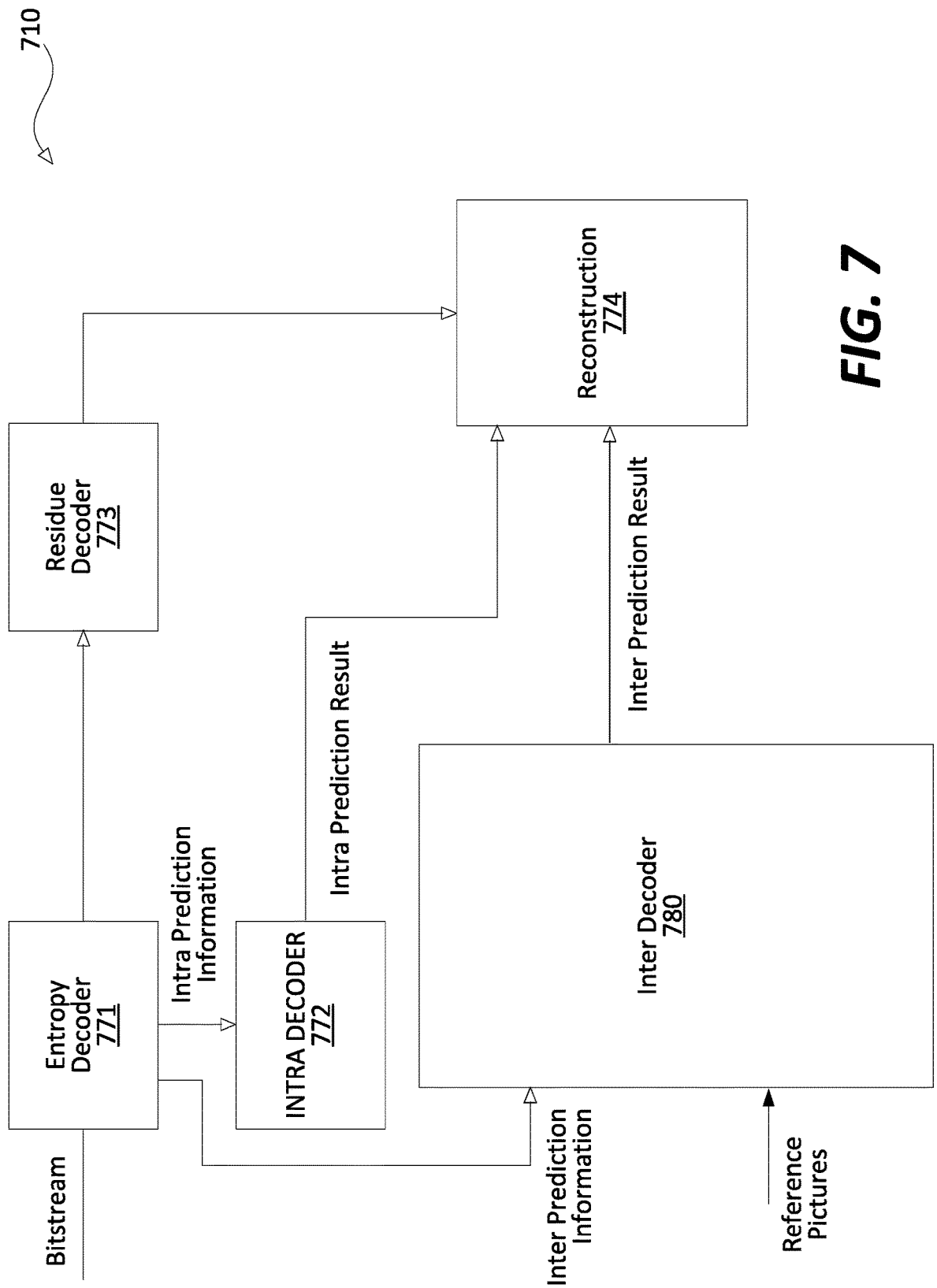
FIG. 7 shows a block diagram of a decoder in accordance with another embodiment.

FIG. 7 shows a diagram of a video decoder (710) according to another embodiment of the disclosure. The video decoder (710) is configured to receive a coded pictures that are part of a coded video sequence, and decode the coded picture to generate a reconstructed picture. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (772) or the inter decoder (780) respectively residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter QP), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503) and (603), and the video decoders (310), (410) and (710) can be implemented using any suitable technique. In an embodiment, the video encoders (303), (503) and (603), and the video decoders (310), (410) and (710) can be implemented using one or more integrated circuits. In another embodiment, the video encoders (303), (503) and (503), and the video decoders (310), (410) and (710) can be implemented using one or more processors that execute software instructions.

Described below is the operation of the motion vector prediction according to the disclosed subject matter.

In general, motion compensation refers to techniques where one or more motion vectors (MVs) are used to indicate a displacement of a sample or an area of samples relative to a position of the sample or the area of samples in a reference picture. In order to simplify the description, henceforth, the areas of samples are assumed to be of rectangular shape and are referred to as "a block" or "a sub-block", depending on context. The disclosure is applicable to and can be adapted accordingly for areas that are not rectangular shaped.

In some embodiments, MVs of a block to be motion compensated can be predicted from one or more blocks that are coded, i.e., encoded/decoded. In some embodiments, two modes of MV prediction can be used, and the two modes include a merge mode and a residual mode. The merge mode, as used herein, refers to MV predictions using one or more MV predictors (such as, MVs associated with surrounding or neighboring samples of the block) without the use of a residual MV. Which of the MVs, in what combination, and with what weighting among the MVs are used can, in some examples, be coded as additional (or side) information. In other examples, the additional information may be predictable, and, therefore, may not need to be explicitly coded. The residual mode (or regular mode) refers to the use of a residual MV that is also coded in addition to the side information. For example, in the residual mode, a MV of a current block can be obtained by adding a MV predictor of the current block and a residual MV of the current block. As described above, the side information may or may not be coded. In some embodiments, in a same video picture coded in accordance with a given video coding technology, both the merge mode and the residual mode are employed.

Embodiments of the present disclosure can be used in the merge mode, the residual mode, or a combination thereof. The description below uses the merge mode as an example unless noted otherwise for purposes of clarity.

In general, the techniques for MV predictions described herein can be implemented in, or be part of, a video encoder (also referred to as an encoder) or a video decoder (also referred to as a decoder). As described above, encoders and decoders can implement similar techniques, such as MV predictions. Therefore, in the same or another embodiment, the disclosed subject matter can be part of a decoder or an encoder. With this understanding, for conciseness, described below is for decoder operation unless noted otherwise.

Figure 8:
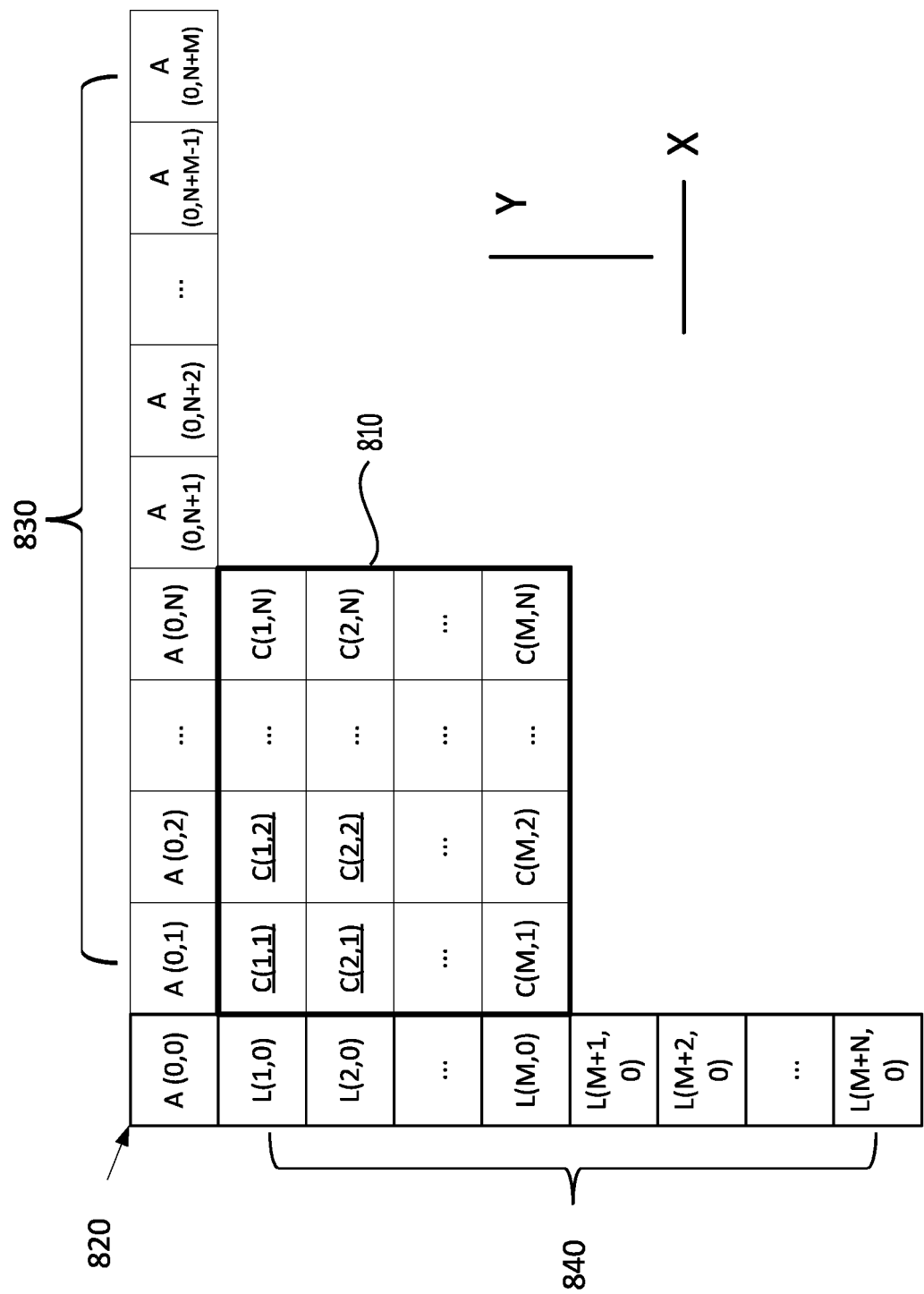
FIG. 8 is a schematic illustration of a motion vector prediction of a block and sub-blocks used for, or affected by, motion vector prediction.

FIG. 8 shows a diagram of a current block (810) and neighboring sub-blocks (820, 830, 840). The current block (810) under reconstruction can be coded using the merge mode, thus, displacements of samples in the current block (810) can be derived from already decoded spatial/temporal neighboring blocks' motion information, including MVs, and without a residual MV. As described above, the residue MV is zero or is assumed to be zero in the merge mode, and therefore does not need to be coded. According to aspects of the disclosure, the current block (810) includes an array of motion vector units that, for example, are smaller than the current block (810). The motion vector units are also referred to as sub-blocks, and MVs of individual sub-blocks can be different and are determined based on respective MVs of the neighboring sub-blocks (820, 830, 840). Similarly, the neighboring sub-blocks (820, 830, 840) also refer to smaller MV units. In general, a sub-block can include one or more samples.

The sub-blocks can be of any shape, with or without gaps. In order to simplify the description, the sub-blocks are assumed to be rectangular. Each sub-block can include K×L samples, for example, luminance samples where K and L are positive integers. In some examples, similar sub-blocks of equal or similar size derive their respective MVs from a dedicated main sub-block. For example, in some video processing systems employing video decoders, a video is sampled in a YCrCb 4:2:0 sampling structure with luminance samples Y in a luma plane and corresponding chrominance samples Cr and Cb in respective chroma planes. The chrominance samples Cr and Cb are subsampled. Accordingly, the spatially corresponding sub-blocks in the chroma planes can derive the MVs from the luminance sub-block, i.e., the dedicated main sub-block.

In another example, the dedicated main sub-block, also referred to as a G sub-block, can include the green (G) samples of a picture using a RGB color space, and sub-blocks including the red (R) and blue (B) samples are handled in the respective R and B color planes. Accordingly, the spatially corresponding sub-blocks in the R and B color planes can derive the MVs from the G sub-blocks. In order to simplify the description, the description is given to a dedicated main sub-block in a single plane, such as a luma plane, a specific chroma plane, a specific color plane, and the like. In the same or another embodiment, motion information, such as MVs, of other planes may be predicted only from coded motion information related to the single plane, even if the video bitstream contains information related to multiple color planes. In the same or another embodiment, motion information for certain color planes may be derived from motion information associated with another color plane.

In the same or another embodiment, a sub-block can have zero, one, or more MVs. In the case of a single prediction (such as in P-pictures in MPEG-2), a single MV can be used in the sub-block. In the case of bi-prediction (such as in direct mode of B pictures in MPEG-2), a two MVs can be used in the sub-block, one for each prediction direction (a forward prediction and a backward prediction). In certain multiple prediction coding cases, more than two MVs can be used in the sub-block. When a sub-block is not predicted, zero MVs are associated with the sub-block. In order to simplify the description below, described are cases where a sub-block has a single MV associated with the sub-block. The description can be suitably adapted to cases that involve two or more MVs in the sub-block.

Referring to FIG. 8, each sub-block can include K×L samples. As noted above, K and L can be positive integer numbers. In one example, K=L=4, such that each sub-block has 4×4 samples. The sub-blocks in the current block (810)

may have different MVs. In another example, K=L=1, such that each sub-block has a single sample, and each sample in the current block (810) may have a different MV.

The term "available" or "availability" is introduced below. Certain neighboring samples/sub-blocks or metadata of other prediction entities (such as MVs) may not be "available" for prediction depending on, for example, a spatial position of the neighboring samples/sub-blocks in a picture. Referring to FIG. 8, when the current block (810) under reconstruction is located at the top (in Y dimension) and in the middle (in X dimension) of a picture (not shown), MVs associated with the surrounding sub-blocks A(0, 0)-A(0, N+M) have not been previously reconstructed or decoded because there is no sub-block data above the picture boundary. Accordingly, the surrounding sub-blocks A(0, 0)-A(0, N+M) are unavailable. On the other hand, the surrounding sub-blocks L(M+1, 0) and L(M, 0) are available because the current block (810) is in the middle (in X dimension) of the picture, and there can be MVs associated with one or more sub-blocks to the left of the current block (810). In some embodiments, a bitstream or a video bitstream structure includes the bitstream partitioned into slices or tiles, and so forth, and a current block is at a boundary of a picture segment, for example, a slice, an independent tile, and the like. Accordingly, the boundary of a slice or an independent tile is treated, for the purpose of motion information prediction, as a picture boundary. In some embodiments, an MV of a neighboring block/sub-block, such as the surrounding sub-block L(M+1, 0) in FIG. 8, can be unavailable when the neighboring block/sub-block is coded in a mode which does not allow for motion compensation, such as a MPEG-2 Intra macroblock mode, thus the neighboring block/sub-block is unavailable. Note that the neighboring sub-blocks (820, 830, 840) can also be referred to as reference sub-blocks and surrounding sub-blocks.

FIG. 8 shows an example of a MV prediction in accordance with the same or another embodiment where availability is a factor. The current block (810) can include a plurality of sub-blocks C(1, 1)-C(M,N) with M rows of sub-blocks horizontally and N columns of sub-blocks vertically. M and N are positive integers.

Referring to FIG. 8, the neighboring sub-blocks (820, 830, 840) are adjacent to the current block (810). The neighboring sub-block A(0, 0) (820) is a top-left neighboring sub-block with respect to the current block (810). The neighboring sub-blocks A(0, 1)-A(0, N+M) (830) are the above neighboring sub-blocks (referred to as the top neighboring sub-blocks in some examples) with respect to the current block (810). The neighboring sub-blocks L(1, 0)-L(M+N, 0) (840) are the left neighboring sub-blocks with respect to the current block (810).

Referring to the above neighboring sub-block A(0, i) where i is a positive integer including 1, N+M. Here, the first element 0 in the above neighboring sub-block A(0, i) denotes that a vertical spatial distance, in units of a vertical size of the sub-blocks C(1, 1)-C(M,N), between the neighboring sub-block (820) and the above neighboring sub-block A(0, i) is zero. The second element i in the above neighboring sub-block A(0, i) denotes the position, in units of a horizontal size of the sub-block C(1, 1)-C(M,N), relative to the neighboring sub-block (820). For example, the above neighboring sub-block A(0, 2) is the second neighboring sub-block from the neighboring sub-block (820). A similar nomenclature is utilized for the Y dimension for the left neighboring sub-blocks L(1, 0)-L(M+N, 0) (840).

To simplify the description, the sub-blocks shown in FIG. 8, such as the sub-blocks C(1, 1)-C(M,N), are of a uniform size, however, the sub-blocks C(1, 1)-C(M,N) can be of any suitable sizes including non-uniform sizes and have any suitable shapes including, non-square, or non-rectangular shapes.

When one or more of the neighboring sub-blocks (820, 830, 840) is not available, there are a number of methods to create MV predictors for the respective one or more of the neighboring sub-blocks (820, 830, 840). In an example, MVs are created for the respective one or more of the neighboring sub-blocks (820, 830, 840) using the merge mode. In an example, MV predictors are created for the respective one or more of the neighboring sub-blocks (820, 830, 840) using the residual mode, and MVs for the respective one or more of the neighboring sub-blocks (820, 830, 840) are determined based on the MV predictors and residual MVs for the respective one or more of the neighboring sub-blocks (820, 830, 840).

In the same or another embodiment, an MV or an MV predictor can be inferred to be a zero vector when no MV is available for the MV prediction. The zero vector can be a vector where X and Y components are both zero when the MV or the MV predictor corresponds to a two-dimensional (2D) MV. In case of three-dimensional MVs, the MV or the MV predictor includes the 2D zero vector and a reference picture component. For example, the reference picture component can indicate a first reference picture in a given reference picture list, a reference picture with a smallest GOP distance to the picture currently under reconstruction, and so forth.

In the same or another embodiment, an MV or an MV predictor can be determined using, for example, an MV of a spatially closest available sub-block. For example, in FIG. 8, when the sub-block A(0, N+M) is unavailable, motion information, such as an MV, of the sub-block A(0, N+M−1) can be used to determine the motion information, such as an MV or an MV predictor, of the sub-block A(0, N+M). In general, motion information of a block/sub-block can include any suitable information associated with motion prediction/compensation for the block/sub-block. In some examples, the motion information can include an MV, an MV predictor, a residual MV, and the like for the block/sub-block. In some examples, such as in the residual mode, the MV predictor for the block/sub-block and the residual MV for the block/sub-block can be combined to determine the MV for the block/sub-block.

In another example in FIG. 8, when the sub-block A(0, N+1) is unavailable, motion information, such as an MV, of the sub-block A(0, N) can be used to determine the motion information, such as an MV or an MV predictor, of the sub-block A(0, N+1). The selection of the spatially closest available sub-block can take many different options. For example, when both the sub-block to the left and the sub-block above are available, preference can be given to the sub-block to the left. As an alternative, preference can be given to the sub-block above instead of to the sub-block to the left. A person skilled in the art can readily devise various other similar preference mechanisms.

Both methods described above and any other suitable methods can be used in a same picture. For example, when decoding is performed in the scan order, the top-left sub-block in a picture does not have an MV predictor because the top-left sub-block in the picture is the first sub-block to be decoded in the picture. As a result, a spatially closest available sub-block is not applicable, thus, an MV predictor can be inferred to be a zero vector. For a sub-block elsewhere in the picture, an MV predictor of the sub-block can be determined using an MV of a spatially closest available sub-block.

Figure 9:
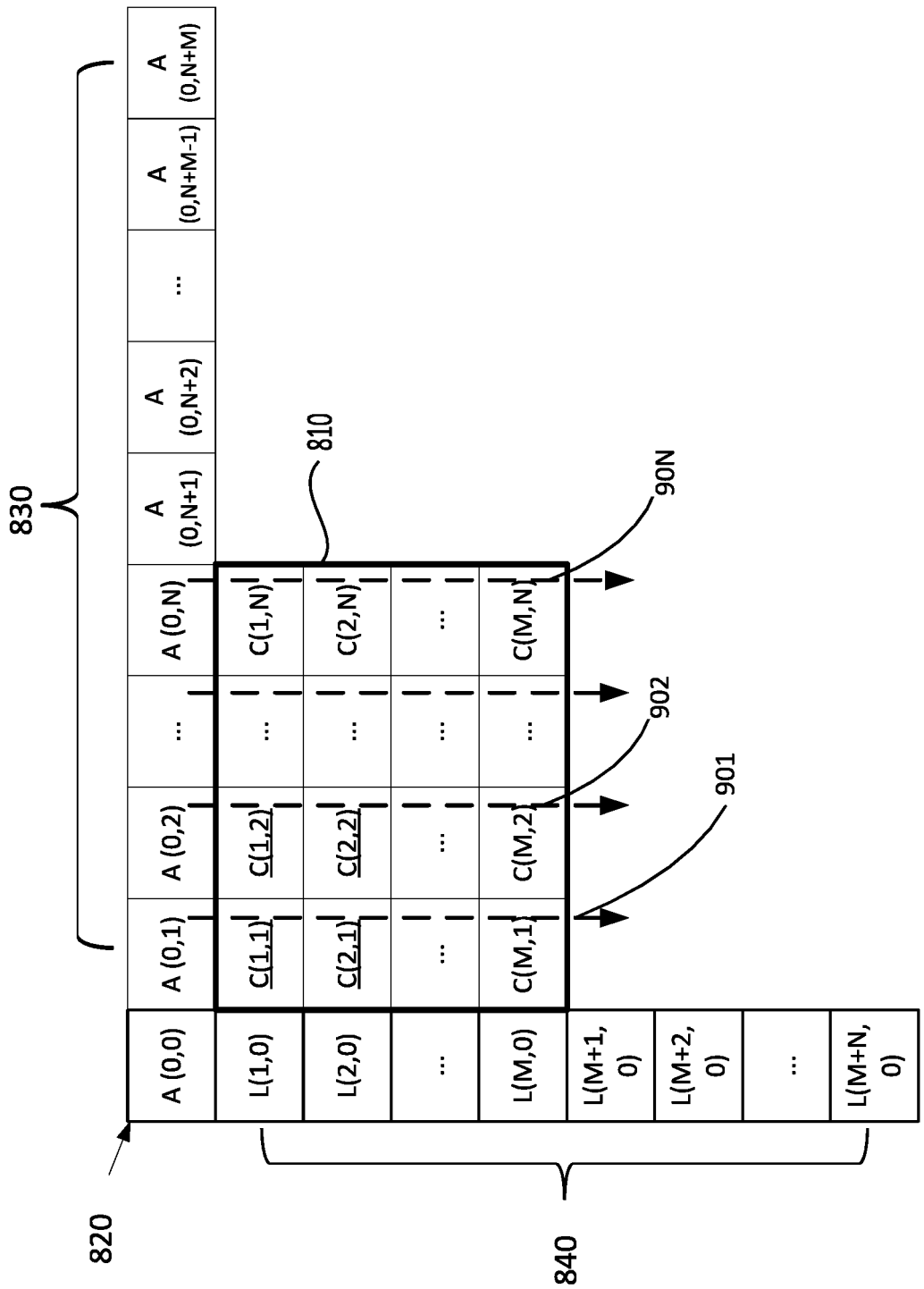
FIG. 9 is a schematic illustration of a vertical motion vector prediction with uniform and square sub-block dimensions.

FIG. 9 shows an example of a MV prediction in accordance with the same or another embodiment. In various embodiments, the MV prediction can also be referred to as an MV prediction method, an MV prediction technique, or the like. The current block (810) and the neighboring sub-blocks (820, 830, and 840) are identical to those shown in FIG. 8. The current block (810) includes one or more columns of the sub-blocks C(1, 1)-C(M,N), referred to as one or more sub-block columns. According to aspects of the disclosure, MV predictors for a sub-block column can be predicted from a MV of one of the top neighboring sub-blocks (830) where the one of the top neighboring sub-blocks (830) is in the same column as the sub-block column. In an example, the sub-blocks C(1, 1), C(2, 1), . . . , and C(M, 1) form a first sub-block column, and MV predictors for the first sub-block column can be predicted using the MV of the top neighboring sub-block A(0, 1), as indicated by an arrow 901. The MV of the top neighboring sub-block A(0, 1) may be available or be predicted as described above. A person skilled in the art can readily understand that a similar technique can be applied to other columns, such as a second sub-block column including the sub-blocks C(1, 2), C(2, 2), . . . , and C(M, 2). MV predictors for the second sub-block column can be predicted from a MV of the top neighboring sub-block A(0, 2), as indicated by an arrow (902). The MV prediction described in FIG. 9 is referred to as a vertical prediction method or a vertical prediction.

In the same or another embodiment, the MV of the top neighboring sub-block A(0, 1) is used unmodified as a MV predictor for the first sub-block column.

The MV prediction described above can offer compression advantages and bitrate savings as MV predictors of a sub-block column can be predicted from an already decoded or otherwise readily usable MV, and therefore may not need to be coded to enable motion compensated prediction.

In some embodiments, the use of vertical prediction described above can be signaled in a video bitstream, for example, by one or more syntax elements located in a suitable header associated with the current block (810). For example, the header can include sequence and picture parameter set, a slice header, a macroblock header, a block header, a Coding Unit (CU) header, and so forth. The signaling can be performed using any suitable form employed in a video coding technology or standard, including, for example, fixed or variable length codewords, entropy coded by techniques such as variable length coding, run-length coding, arithmetic coding, Context-Adaptive Binary Arithmetic Coding (CABAC), and so forth.

Compared to previously known techniques, the disclosed motion vector prediction technique can offer compression advantages and bitrate savings as one or more motion vector predictors of sub-blocks arranged in a column (such as C(1, 1), C(2, 1), . . . , C(M, 1)) can be predicted from an already decoded or otherwise readily usable motion vector, such as of the top neighboring sub-block A(0, 1), and therefore may not need to be coded to enable motion compensated prediction. Use of the motion vector prediction technique may need to be signaled as described above. To balance signaling overhead and potential or truly realized bitrate savings (ideally to the point where bitrate savings are maximized), in addition to an effective coding of the signaling information by, for example, one or more of the techniques mentioned above, it can be advantageous to signal the use of the vertical prediction for more than one sub-block columns.

According to aspects of the disclosure, MV predictors for a plurality of sub-block columns in the current block (810) can be predicted by corresponding MVs of the respective top neighboring sub-blocks (830). Referring to FIG. 9, the current block (810) includes N sub-block columns. In an example, the Nth sub-block column includes the sub-blocks C(1, N), C(2, N), and C(M,N). The MV prediction for the first, the second, . . . , and the Nth sub-block columns is shown by arrows 901-90N, respectively. In an example, the plurality of sub-block columns can include all the sub-block columns in the current block (810). In an example, the plurality of sub-block columns can include a subset of the sub-block columns in the current block (810). A person skilled in the art can readily devise the appropriate subset, such as, the left/right half of the sub-block columns, and so forth.

Using the MVs of the top neighboring sub-blocks A(0, 1)-A(0, N) above the current block (810) as described above may require storing the MVs in, for example, a motion vector line buffer that operates at a sub-block granularity. In the same or another embodiment, additional memory space is allocated to store the MVs in addition to memory requirements of an encoder or decoder not using the disclosed subject matter. Alternatively, the MVs of the top neighboring sub-blocks A(0, 1)-A(0, N) are not stored, and the additional memory space is not used. Therefore, the unavailable MVs of the top neighboring sub-blocks A(0, 1)-A(0, N) may be derived from available sub-block motion vectors using any suitable technique, including the techniques described above.

In an embodiment, all the sub-block columns in the current block (810) are predicted using the vertical prediction described above, thus, minimizing signaling overhead. For example, experiments have shown that, for at least certain block and sub-block sizes and certain video content, bit rate savings can be achieved.

Figure 10:
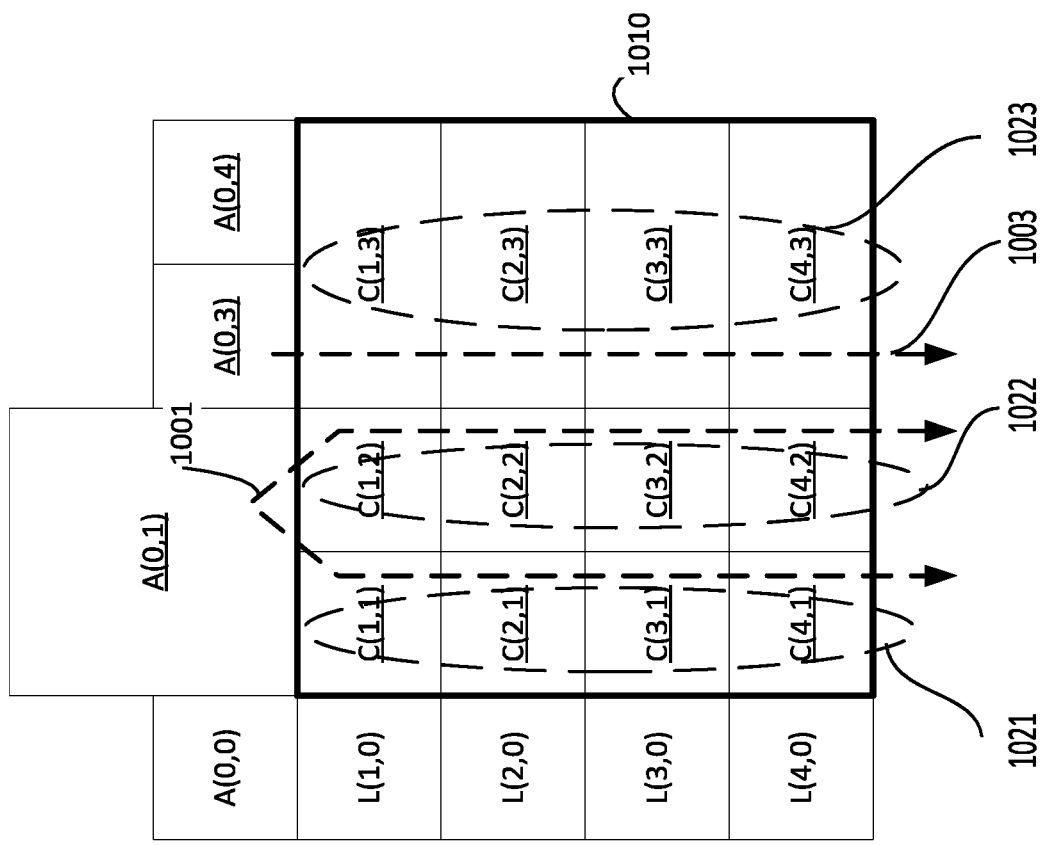
FIG. 10 is a schematic illustration of a vertical motion vector prediction with rectangular and non-uniform sub-block sizes.

The application of the disclosed subject matter is not restricted to scenarios where the sub-blocks are of a uniform size. FIG. 10 shows two examples where a size of sub-blocks of a current block (1010) under reconstruction is different from a size of a top neighboring sub-block, such as A(0, 1), A(0, 3), and A(0, 4). The current block (1010) is divided into three sub-block columns (1021-1023). The sub-block column (1021) includes sub-blocks C(1, 1), C(2, 1), C(3, 1), and C(4, 1), and the sub-block column (1022) includes sub-blocks C(1, 2), C(2, 2), C(3, 2), and C(4, 2). The sub-blocks in the sub-block columns (1021-1022) are square sub-blocks with, for example, 4×4 luma samples (not depicted). The sub-block column (1023) includes non-square sub-blocks C(1, 3), C(2, 3), C(3, 3), and C(4, 3) having a width and a height. The width is twice that of the height, for example, each of the non-square sub-blocks includes 8×4 luma samples (not depicted). Similarly, the top neighboring sub-blocks A(0, 1), A(0, 3), and A(0, 4) are not of the same size. For example, the top neighboring sub-block A(0, 1) is a square sub-block of, for example, 8×8 luma samples, whereas the top neighboring sub-blocks A(0, 3) and A(0, 4) are square sub-blocks of 4×4 luma samples.

In the same or another embodiment, the MV predictors for the sub-block columns (1021, 1022) can be predicted from a MV of the top neighboring sub-block A(0, 1), as shown by a forked line (1001). In the same or another embodiment, MV predictors of more than two sub-block columns can be predicted from a top neighboring sub-block's MV.

MV predictors of the sub-block column (1023) can be derived using any suitable vertical predictions. In an example, the MV predictors of the sub-block column (1023)

can be predicted from the top neighboring sub-block A(0, 3) that is above the sub-block column (1023), as shown by an arrow (1003). In another example, the MV predictors of the sub-block column (1023) can be predicted from the top neighboring sub-block A(0, 4) that is also above the sub-block column (1023) (not predicted). In another example, the MV predictors of the sub-block column (1023) can be predicted from a suitable combination of the MVs of the top neighboring sub-blocks A(0, 3) and A(0, 4). Suitable combinations can include, for example, a smaller MV of the MVs (measured in any suitable dimension or a combination of dimensions and suitably weighted, for example, more weight can be given to a spatial dimension than to a reference picture dimension), an average of the MVs, a linear interpolation of the MVs, any other suitable interpolation of the MVs, and so forth.

MVs from more than two top neighboring sub-blocks can be used for predicting MV predictors of a sub-block column, by suitably combining the MVs. Suitable combinations can include any of the suitable combination described above as well as a median of the MVs.

Referring to FIG. 8, according to aspects of the disclosure, MV predictors for a plurality of sub-blocks along a prediction direction can be predicted from a MV of one of the neighboring sub-blocks (820, 830, 840) where the one of the neighboring sub-blocks (820, 830, 840) is along the same prediction direction as the plurality of sub-blocks, as described in FIGS. 9 and 10 above and in FIGS. 11-16 below. In some examples, the one of the neighboring sub-blocks (820, 830, 840) is adjacent to the plurality of sub-blocks.

Figure 11:
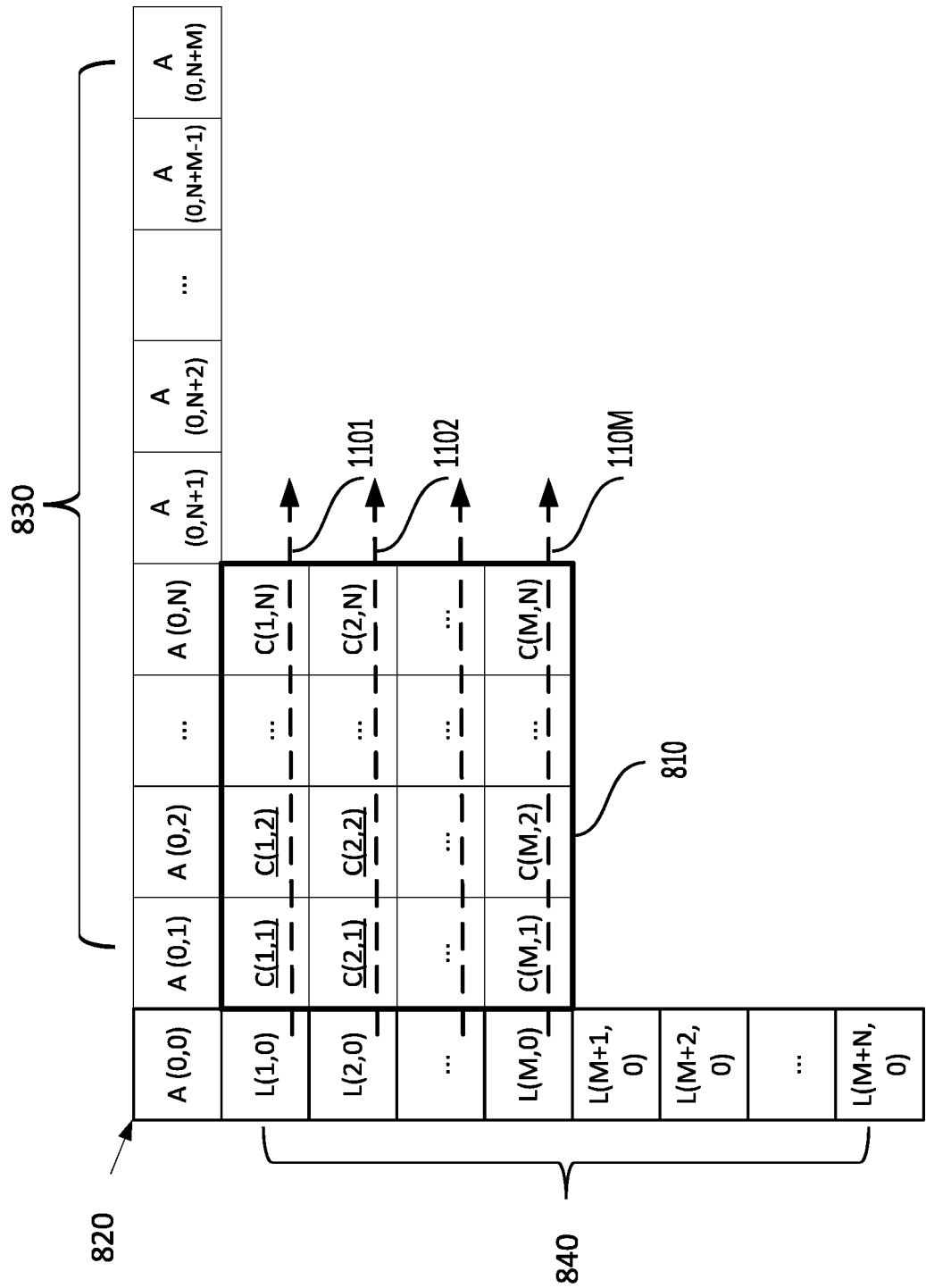
FIG. 11 is a schematic illustration of a horizontal motion vector prediction with uniform and square sub-block dimensions.

The vertical prediction including various embodiments/adaptions described above in FIGS. 9 and 10 can be suitably adapted to other directions, such as a horizontal prediction (or a horizontal prediction method) as shown in FIG. 11. FIG. 11 shows an example of a MV prediction in accordance with the same or another embodiment. The current block (810) and the neighboring sub-blocks (820, 830, and 840) are identical to those shown in FIG. 8. The current block (810) includes one or more rows of the sub-blocks C(1, 1)-C(M,N), referred to as one or more sub-block rows. According to aspects of the disclosure, MV predictors for a sub-block row can be predicted from a MV of one of the left neighboring sub-blocks (840) where the one of the left neighboring sub-blocks (840) is to the left of the sub-block column. In an example, the sub-blocks C(1, 1), C(1, 2), . . . , and C(1, N) form a first sub-block row, and MV predictors for the first sub-block row can be predicted using the MV of the left neighboring sub-block L(1, 0), as indicated by an arrow (1101). Additional descriptions of other variations and embodiments are similar to those of the vertical prediction shown in FIGS. 9-10 and are omitted for purposes of clarity.

Figures 12A, 12B:
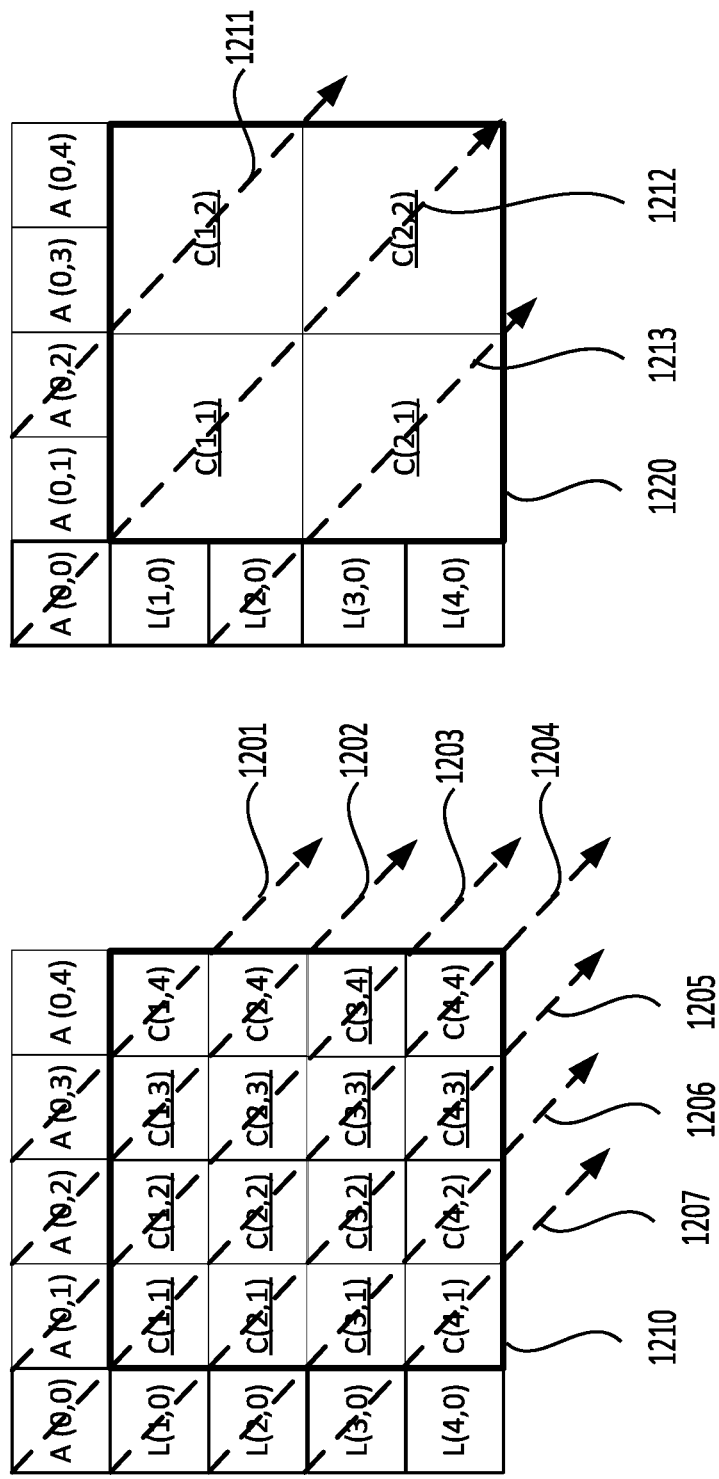
FIG. 12A is a schematic illustration of a diagonal motion vector prediction with uniform and square sub-block dimensions.
FIG. 12B is a schematic illustration of a diagonal motion vector prediction with non-uniform sub-block dimensions.

FIG. 12A shows an example of a MV prediction in accordance with the same or another embodiment. For purposes of clarity, a current block (1210) includes 4×4 sub-blocks C(1, 1)-C(4, 4). Neighboring sub-blocks include A(0, 0)-A(0, 4), and L(1, 0)-L(4, 0). According to aspects of the disclosure, MV predictors of sub-blocks along a top-left diagonal direction (also referred to as a diagonal prediction direction), such as indicated by an arrow (1204), can be predicted from a MV of one of the neighboring sub-blocks where the one of the neighboring sub-blocks is to the top-left of the sub-blocks. In an example, the sub-blocks C(1, 1), C(2, 2), C(3, 3), and C(4, 4) form a first sub-block group, and MV predictors for the first sub-block group can be predicted using the MV of the neighboring sub-block A(0, 0), as indicated by the arrow (1204). Similarly, MV predictors of other sub-block groups can be predicted using MVs of their respective neighboring sub-blocks, as indicated by the arrows (1201-1203) and (1205-1207). The MV prediction described in FIG. 12A is referred to as a diagonal prediction (or a diagonal prediction method) with a diagonal prediction direction.

Additional descriptions of other variations and embodiments are similar to those of the vertical prediction shown in FIGS. 9-10 and are omitted for purposes of clarity. As an example of the other variations and embodiments, FIG. 12B shows an example where a size of sub-blocks of a current block (1220) is different from a size of a neighboring sub-block, such as A(0, 0)-A(0, 4) and L(1, 0)-L(4, 0). The current block (1220) is divided into four square sub-blocks C(1, 1), C(1, 2), C(2, 1), and C(2, 2) with, for example, 8×8 luma samples (not depicted). The neighboring sub-blocks A(0, 0)-A(0, 4) and L(1, 0)-L(4, 0) are square sub-blocks with, for example, 4×4 luma samples. In an embodiment, MV predictors of a first sub-block group including C(1, 1) and C(2, 2) along the top-left diagonal direction indicated by an arrow (1212), can be predicted from a MV of the neighboring sub-block A(0, 0).

Figure 13:
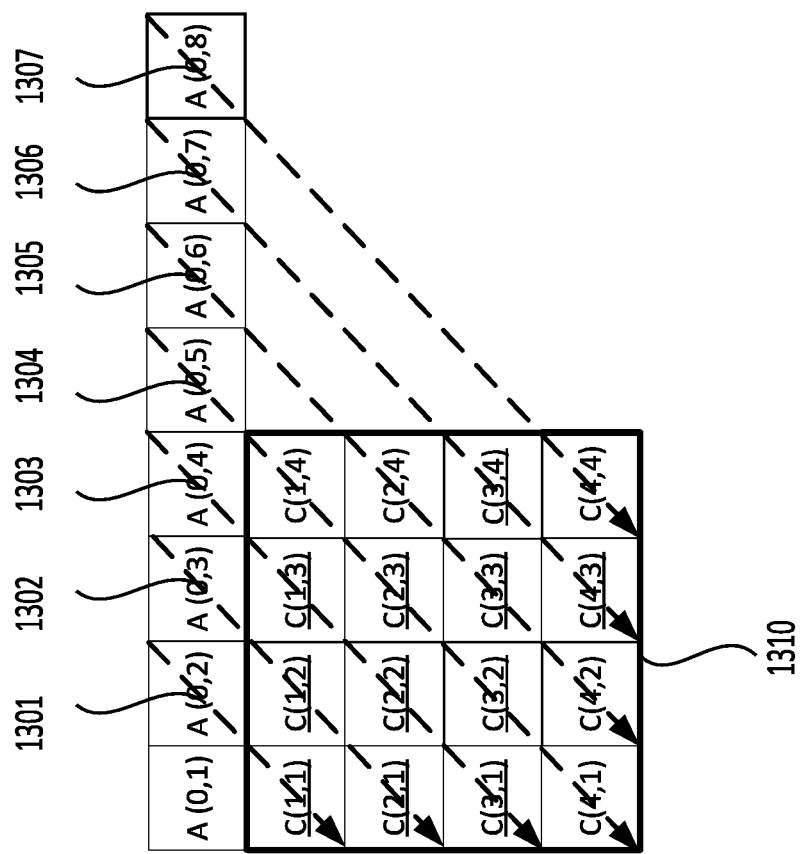
FIG. 13 is a schematic illustration of a top-right diagonal motion vector prediction with uniform and square sub-block dimensions.

FIG. 13 shows an example of a MV prediction in accordance with the same or another embodiment. For purposes of clarity, a current block (1310) includes 4×4 sub-blocks C(1, 1)-C(4, 4). Top neighboring sub-blocks include A(0, 0)-A(0, 8). According to aspects of the disclosure, MV predictors of sub-blocks along a top-right diagonal direction (also referred to as a top-right prediction direction), such as indicated by an arrow (1304), can be predicted from a MV of one of the top neighboring sub-blocks where the one of the top neighboring sub-blocks is to the top-right of the sub-blocks. In an example, the sub-blocks C(1, 4), C(2, 3), C(3, 2), and C(4, 1) form a first sub-block group, and MV predictors for the first sub-block group can be predicted using a MV of the neighboring sub-block A(0, 5), as indicated by the arrow (1304). Similarly, MV predictors of other sub-block groups can be predicted using MVs of the respective top neighboring sub-blocks, as indicated by arrows (1301-1303), and (1305-1307). Additional descriptions of other variations and embodiments are similar to those of the vertical prediction shown in FIGS. 9-10 and are omitted for purposes of clarity. The MV prediction described in FIG. 13 is referred to as a top-right diagonal prediction (or a top-right diagonal prediction method) with the top-right diagonal prediction direction.

Figure 14:
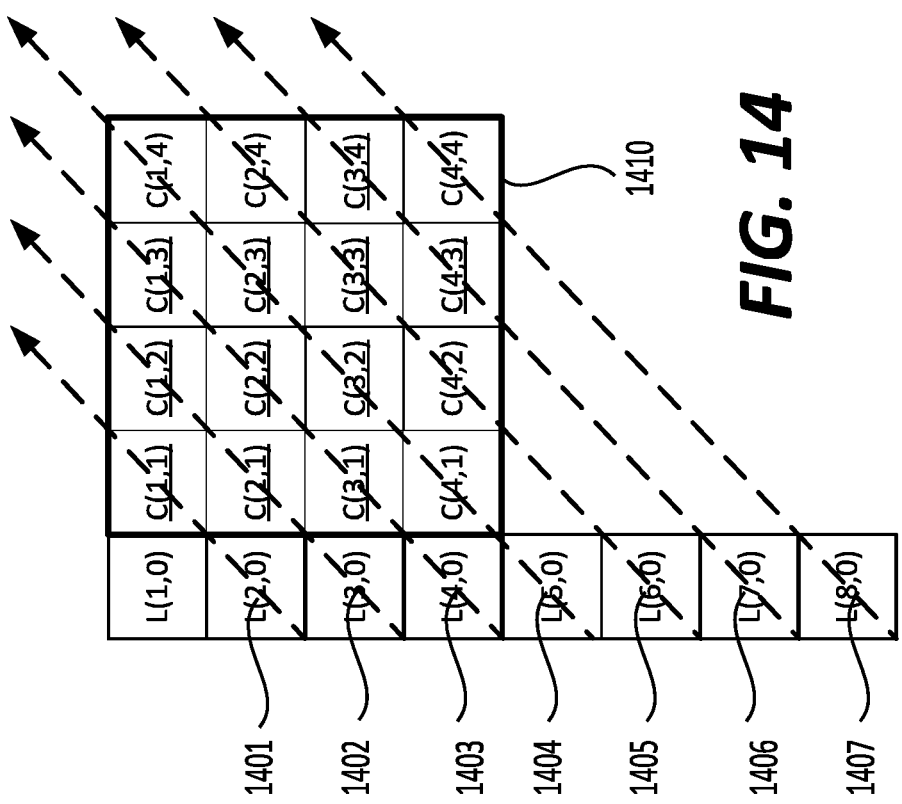
FIG. 14 is a schematic illustration of a bottom-up diagonal motion vector prediction with uniform and square sub-block dimensions.

FIG. 14 shows an example of a MV prediction in accordance with the same or another embodiment. For purposes of clarity, a current block (1410) includes 4×4 sub-blocks C(1, 1)-C(4, 4). Left neighboring sub-blocks include L(1, 0)-L(8, 0). According to aspects of the disclosure, MV predictors of sub-blocks along a bottom-left diagonal direction, such as indicated by an arrow (1404), can be predicted from a MV of one of the left neighboring sub-blocks where the one of the left neighboring sub-blocks is to the bottom-left of the sub-blocks. In an example, the sub-blocks C(1, 4), C(2, 3), C(3, 2), and C(4, 1) form a first sub-block group, and MV predictors for the first sub-block group can be predicted using the MV of the left neighboring sub-block L(5, 0), as indicated by the arrow (1404). Similarly, MV predictors of other sub-block groups can be predicted using MVs of the respective left neighboring sub-blocks, as indicated by arrows (1401-1403) and (1405-1407). Additional descriptions of other variations and embodiments are similar to those of the vertical prediction shown in FIGS. 9-10 and are omitted for purposes of clarity. The MV prediction described in FIG. 14 is referred to as a bottom-left diagonal prediction (or a bottom-left diagonal prediction method) with the bottom-left diagonal prediction direction.

Note that in the various predictions described above, each sub-block in a current block under reconstruction can correspond to a specific neighboring sub-block. For example, in FIG. 12A, the sub-block C(4, 4) corresponds to the neighboring sub-block A(0, 0), thus, the MV predictor for the sub-block C(4, 4) is predicted from motion information of the neighboring sub-block A(0, 0).

Figure 15:
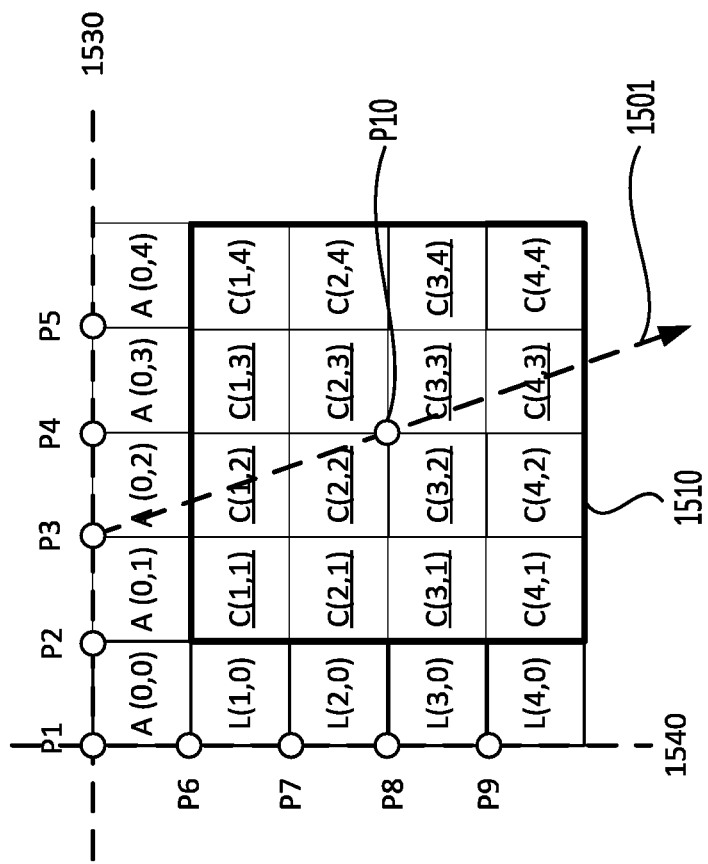
FIG. 15 is a schematic illustration of a motion vector prediction with a prediction direction 1501.
Figure 16:
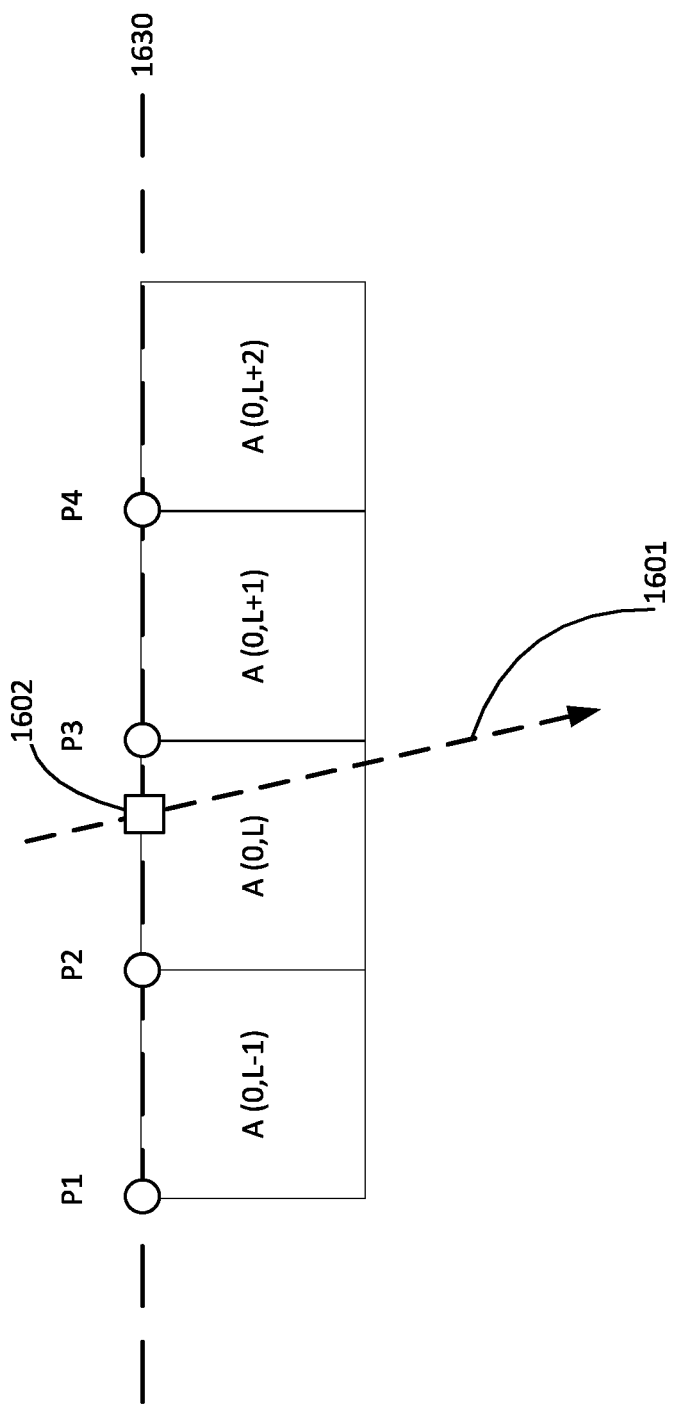
FIG. 16 is a schematic illustration of a motion vector prediction with a non-integer location.

In addition to predicting MV predictors for a plurality of sub-blocks in a row, in a column, or along a certain diagonal direction, in a current block using neighboring sub-blocks of the current block, MV predictors for a plurality of sub-blocks along any suitable prediction direction can be predicted using one or more neighboring sub-blocks, as shown in FIGS. 15-16.

To simplify the description, FIG. 15 shows a current block under reconstruction (1510) that includes 4×4 sub-blocks C(1, 1)-C(4, 4) and neighboring sub-blocks A(0, 0)-A(0, 4) and L(1, 0)-L(4, 0). Positions of the sub-blocks C(1, 1)-C(4, 4) and the neighboring sub-blocks A(0, 0)-A(0, 4) and L(1, 0)-L(4, 0) can be represented by respective samples in the sub-blocks C(1, 1)-C(4, 4) and the neighboring sub-blocks A(0, 0)-A(0, 4) and L(1, 0)-L(4, 0). In general, positions of any suitable samples in a block or a sub-block can be used to represent a position of the block or the sub-block, such as a top-left corner, a center position, and the like of the block/sub-block. In some embodiments, such as shown in FIG. 15, a top-left sample of a sub-block is used to represent a position of the sub-block. As described above, any suitable prediction direction can be used in predicting MV predictors for a plurality of sub-blocks in the current block (1510). Referring to FIG. 15, a prediction direction is indicated by an arrow (1501). In an embodiment, an MV predictor of a sub-block is predicted by extending the prediction direction from a position of the sub-block to be predicted to find a corresponding neighboring sub-block. For example, in FIG. 15, an MV predictor of the sub-block C(3, 3) is predicted by A(0, 2) because a position of the neighboring sub-block A(0, 2), represented by the top-left sample of the neighboring sub-block A(0, 2), lies in the extended prediction direction.

Referring to FIG. 15, a horizontal reference line (1530) goes through positions P1-P5 of the neighboring sub-blocks A(0, 0)-A(0, 4), respectively. A vertical reference line (1540) goes through positions P1 and P6-P9 of the neighboring sub-blocks A(0, 0) and L(1, 0)-L(4, 0). In some embodiments, an extended prediction direction intersects with the horizontal reference line (1530) or the vertical reference line (1540) at a location that is not a position of a neighboring sub-block, thus, the location is referred to as a non-integer location. In other embodiments, when an extended prediction direction and the horizontal reference line (1530) or the vertical reference line (1540) intersect at a position of a neighboring sub-block, such as one of the positions P1-P9, the corresponding neighboring sub-block can be used to predict motion information of the sub-block. For example, techniques related to FIGS. 9 and 11-14 use integer positions to perform MV prediction.

For a non-integer location, the MV for the intersected non-integer location can be derived from MVs for neighboring sub-blocks that are adjacent to the non-integer location. FIG. 16 shows neighboring sub-blocks A(0, L−1)-A(0, L+2) of a current block under reconstruction (not shown). A prediction direction indicated by an arrow (1601) intersects a horizontal reference line (1630) at a location (1602) that is a non-integer location. As described above, motion information associated with the intersected non-integer location or the location (1602), can be derived from motion information associated with neighboring sub-blocks that are adjacent to the location. In some embodiments, the motion information associated with the location (1602) can be derived from a weighted average of the motion information associated with the respective neighboring sub-blocks, such as the neighboring sub-blocks A(0, L) and A(0, L+1).

In an embodiment, a weight associated with the respective neighboring sub-block is inversely proportional to a distance between the location (1602) and a position of the neighboring sub-block. Referring to FIG. 16, weights w1 and w2 correspond to the neighboring sub-blocks A(0, L) and A(0, L+1), a distance d1 is a distance between the location (1602) and a position P2 of the neighboring sub-block A(0, L), and a distance d2 is a distance between the location (1602) and a position P3 of the neighboring sub-block A(0, L+1). Accordingly, a ratio of w1/w2 is inversely proportional to a ratio of d1/d2, for example, w1/w2=d2/d1. Therefore, the motion information associated with the location (1602) can be equal to a weighted summation of the respective motion information associated with the neighboring sub-blocks A(0, L) and A(0, L+1).

In another embodiment, motion information from additional neighboring sub-blocks, such as the neighboring sub-blocks A(0, L−1) and A(0, L+1), is also included but larger weights are given to the closest neighboring sub-blocks A(0, L) and A(0, L+1). In various examples, a number of neighboring sub-blocks that contribute to the motion information associated with the location (1602) can be any suitable positive integers, such as 2, 4, or the like.

In an embodiment, the motion information associated with the closest neighboring sub-block is used. Referring to FIG. 16, the location (1602) is closer to A(0, L+1) than to A(0, L) (d2<d1), thus the motion information of A(0, L+1) is chosen to predict MV predictors for respective sub-blocks along the prediction direction indicated by the arrow 1601 in the current block.

In some embodiments, a neighboring sub-block is chosen according to a quantized location of the location (1602). A quantization method is defined to locate the quantized location so that after using the quantization method, the quantized location falls into a representative position of a respective neighboring sub-block. For example, a flooring operation (choosing the largest integer that is smaller or equal to a current value) is chosen as the quantization method. After the flooring operation, the location (1602) shares the same position with P2, thus the motion information of A(0, L) is chosen to predict MV predictors for respective sub-blocks in the current block. In another example, a ceiling operation (choosing the smallest integer that is larger or equal to a current value) is chosen as the quantization method. After the ceiling operation, the location (1602) shares the same position with P3, thus the motion information of A(0, L+1) is chosen to predict MV predictors for respective sub-blocks in the current block. In some examples, the MV predictions described in FIGS. 9 and 11-14 are special examples of the MV prediction described in FIGS. 15 and 16.

As described above in reference to FIGS. 9-16, MV predictors of a plurality of sub-blocks (e.g., in a single row, column, or diagonal) can be predicted from an already decoded or otherwise readily usable MV, and therefore may not need to be coded to enable motion compensated prediction. Further, in some examples, MV predictors of all sub-blocks in a current block under reconstruction can be predicted from a plurality of already decoded or otherwise readily usable MVs, and therefore may not need to be coded to enable motion compensated prediction. Therefore, the MV prediction methods described above can offer compression advantages and bitrate savings.

According to aspects of the disclosure, the techniques described above can be suitably combined to predict MV predictors of respective sub-blocks in a current block. In various embodiments, first MV predictors of the sub-blocks can be predicted using a MV prediction method, for example, the vertical prediction, second MV predictors of the sub-blocks can be predicted using another MV prediction method, for example, the horizontal prediction, the first MV predictors and the corresponding second MV predictors of the sub-blocks can be suitably combined to generate combined MV predictors of the sub-blocks.

In an example, first MV predictors of the sub-blocks can be predicted using the top-right diagonal prediction, second MV predictors of the sub-blocks can be predicted using the bottom-left diagonal prediction, the first MV predictors and the corresponding second MV predictors of the sub-blocks can be suitably combined to generate combined MV predictors of the sub-blocks.

In various examples, the combined MV predictors are obtained using a weighted combination of the first and second MV predictors, thus, the combined MV predictors for the sub-blocks are predicted by both top and the left neighboring sub-blocks associated with the current block. In some examples, combined MV predictors can be obtained using a weighted combination of respective MV predictors from various diagonal predictions, such as the top-right diagonal prediction and the bottom-left diagonal prediction. Any suitable weights can be applied to the sub-blocks. In some examples, different weights can be applied to the sub-blocks. In one embodiment, a weight is related to a distance between the sub-block and the respective neighboring sub-block used to predict the motion information of the sub-block. For example, when the neighboring sub-block is closer to the sub-block, a higher weight is applied to the MV predictor associated with the neighboring sub-block.

In some examples, the use of a prediction method described above can be signaled in a video bitstream, for example, by a codeword, one or more syntax elements, and the like. For example, the codeword or the one or more syntax elements can indicate the prediction method and information associated with the prediction method, such as the vertical prediction, the horizontal prediction, the diagonal prediction, and the like.

As described above, the application of the disclosed subject matter is not restricted to scenarios where sub-blocks are of a uniform size. FIGS. 10 and 12B show various examples where a size of sub-blocks of a current block is different from a size of a neighboring sub-block. In general, other MV predictions described above, such as in FIGS. 11, 13-16 can be suitably adapted to be applicable to various scenarios where a size of sub-blocks of a current block is different from a size of a neighboring sub-block.

In some embodiments, MVs of sub-blocks in a current block are obtained based on respective MV predictors of the sub-blocks. In some examples, the MVs can be obtained by refining the respective MV predictors using decoder side motion vector derivation methods, such as template matching, bilateral matching, and the like. The refined MVs for the sub-blocks are used in motion compensation. In various examples, the same or similar MV prediction and refinement can be performed at both encoder and decoder side, thus, no additional information is needed to be signaled in the video bitstream.

In some embodiments, such as in the residual or regular mode, MVs of sub-blocks in a current block under reconstruction are obtained based on respective MV predictors of the sub-blocks and corresponding residual MVs that are coded.

In general, sub-block based merge candidates associated with the MV prediction methods described above, also referred to as sub-block candidates, can be integrated into a merge candidate list that includes various existing merge candidates, such as block-based merge candidates, affine merge candidates, and the like. In some examples, one or more of the sub-block candidates can replace one or more of the various existing merge candidates.

Referring to FIG. 8, in a first example, when the vertical prediction and the horizontal prediction are considered, a merge candidate list can include A(0, N+1), the vertical prediction, A(0, 0), the horizontal prediction, L(M+1, 0), and the like where A(0, N+1), A(0, 0), and L(M+1, 0) represent block-based merge candidates. In a second example, when the vertical prediction, the horizontal prediction, and the diagonal prediction are considered, a merge candidate list can include A(0, N+1), the vertical prediction, the diagonal prediction, the horizontal prediction, L(M+1, 0), and the like. In a third example, a merge candidate list can include the right-down diagonal prediction, the vertical prediction, the diagonal prediction, the horizontal prediction, the left-up diagonal prediction, and the like. In a fourth example, a merge candidate list can include A(0, N+1), the right-down diagonal prediction, the vertical prediction, A(0, 0), the diagonal prediction, the horizontal prediction, L(M+1, 0), the left-up diagonal prediction, and the like. In various embodiments, an order of existing merge candidates and sub-block candidates in a candidate list can be changed.

When all sub-blocks in a current block under reconstruction share the same motion information, a sub-block based MV prediction becomes a block based MV prediction. When the motion information represented by the sub-block candidate is already represented by a certain block-based merge candidate, the sub-block candidate duplicates the block-based merge candidate, and the duplicated sub-block candidate can be removed from the merge candidate list.

Figure 17:
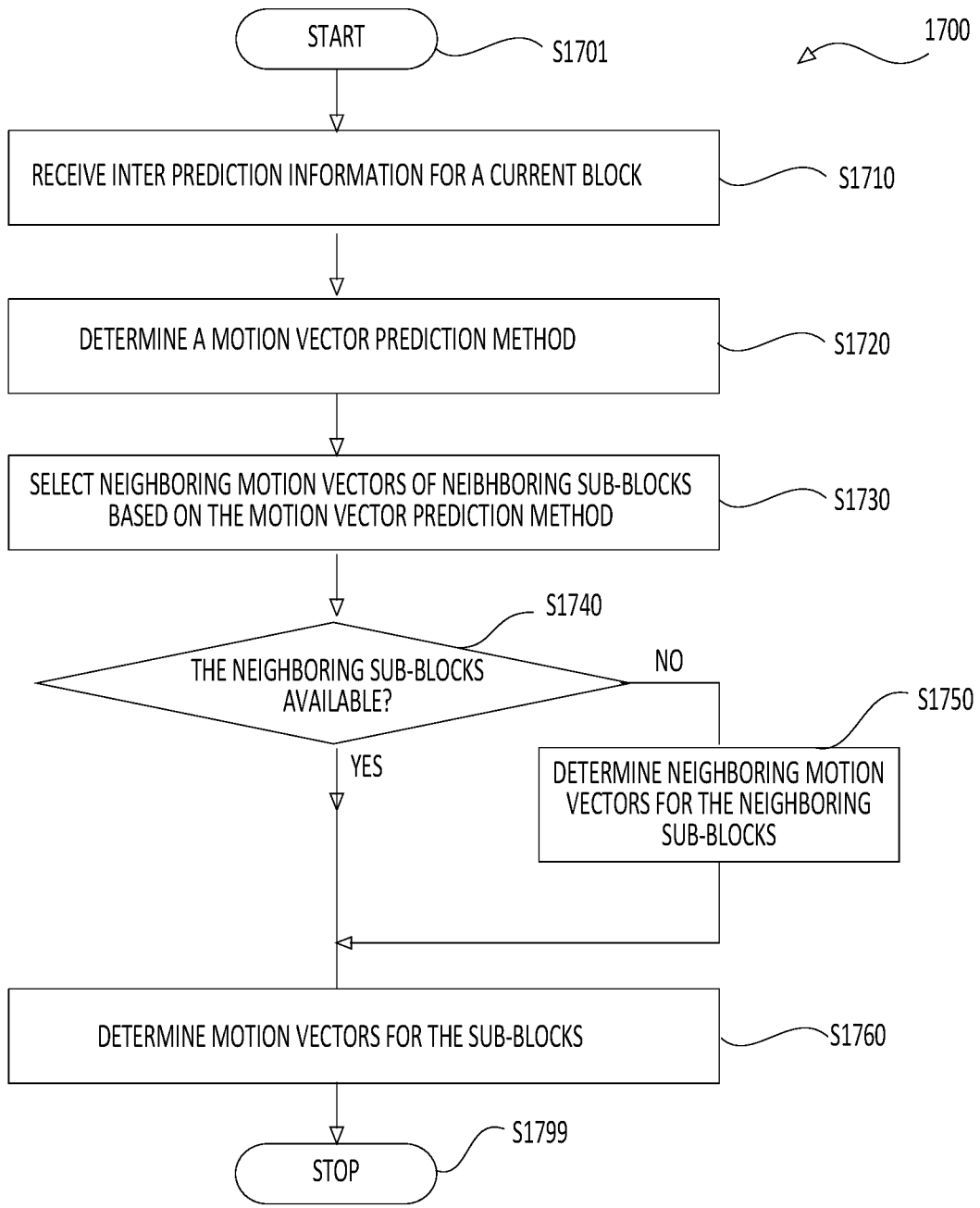
FIG. 17 shows a flow chart outlining a process (1700) according to some embodiments of the disclosure.

FIG. 17 shows a flow chart outlining a process (1700) according to some embodiments of the disclosure. The process (1700) is used in a merge mode to generate a prediction block for a current block. In various embodiments, the process (1700) is executed by processing circuitry, such as the processing circuitry in the terminal devices (210, 220, 230 and 240), the processing circuitry that performs functions of the video encoder (303), the processing circuitry that performs functions of the video decoder (310), the processing circuitry that performs functions of the video decoder (410), the processing circuitry that performs functions of the motion compensation prediction module (453), the processing circuitry that performs functions of the video encoder (503), the processing circuitry that performs functions of the predictor (535), the processing circuitry that performs functions of the inter encoder (630), the processing circuitry that performs functions of the inter decoder (780), and the like. The process starts at (S1701) and proceeds to (S1710).

At (S1710), inter prediction information for the current block is received or otherwise acquired. For example, the inter prediction information is indicative of a merge mode. Thus, the processing circuitry constructs a merge candidate list for the merge mode for inter prediction. In an example, the candidate list includes sub-block candidates determined using the vertical prediction, or the like as described above.

At (S1720), the processing circuitry determines a certain MV prediction method to predict the MV predictors of the current block. In some embodiments, the certain MV prediction method can be the vertical prediction, the horizontal prediction, the diagonal prediction, or MV prediction along any suitable prediction direction as described above. In some examples, the certain MV prediction method can utilize a weighted combination of MV predictors obtained from multiple MV predictions, such as the vertical prediction and the horizontal prediction.

At (S1730), the processing circuitry selects neighboring MVs that are associated with neighboring sub-blocks of the current block based on the MV prediction method. For example, referring to FIG. 9, when the vertical prediction is selected at (S1720) for the current block (810), the MVs of the neighboring sub-blocks A(0, 1) to A(0, N) are selected to predict the MV predictors for the sub-block columns (901-90N), respectively.

At (S1740), the processing circuitry determines whether the neighboring sub-blocks are available, as described above. When one or more of the neighboring motion vectors are unavailable, the process (1700) proceeds to (S1750). When the neighboring sub-blocks are available, the process (1700) proceeds to (S1760).

At (S1750), the processing circuitry determines neighboring MVs for the one or more unavailable neighboring sub-blocks, as described above. The process (1700) then proceeds to (S1760).

At (S1760), the processing circuitry determines MVs for the sub-blocks in the current block based on the respective neighboring MVs, such as described with reference to FIGS. 9-16. Then the process proceeds to (S1799) and terminates.

In some embodiments, the process (1700) can include other steps. In an example, the process (1700) can generate the sub-blocks according to the MVs for the sub-blocks. Further, the process (1700) can combine the sub-blocks to form a prediction block for the block The techniques for motion vector prediction with sub-block granularity, described above, can be implemented as computer software using computer-readable instructions and physically stored in one or more computer-readable media. For example, FIG. 18 shows a computer system 1800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
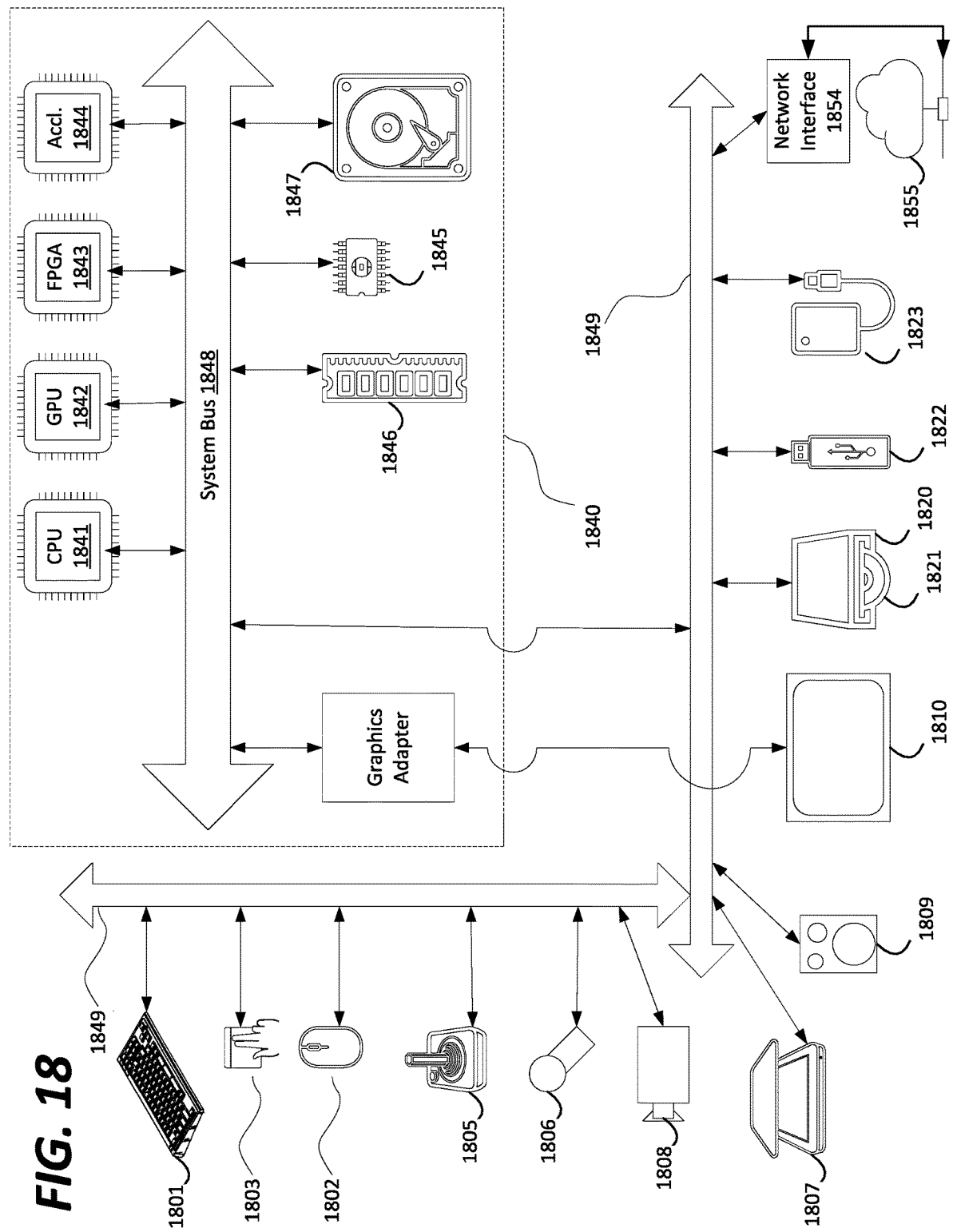
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   selecting, by processing circuitry of the decoder, a neighboring sub-block outside a current block for a current sub-block in the current block based on a prediction direction that indicates a spatial relationship between the current sub-block and the selected neighboring sub-block, the selected neighboring sub-block and the current block being in a coded picture from a coded bitstream, and a representative position of the current sub-block being on a reference line extended along the prediction direction from a reference position that is on or adjacent to a representative position of the selected neighboring sub-block;
   determining, by the processing circuitry of the decoder, a reference motion vector corresponding to the reference position based on a motion vector for coding the selected neighboring sub-block;

determining, by the processing circuitry of the decoder, a motion vector predictor for the current sub-block based on the reference motion vector; and decoding the current sub-block for output using inter-picture prediction performed based on the motion vector predictor.

2. The method of claim 1, wherein the selected neighboring sub-block and the current sub-block are in a same column of the coded picture, and the selected neighboring sub-block is a top neighbor of the current block.

3. The method of claim 1, wherein the selected neighboring sub-block and the current sub-block are in a same row of the coded picture, and the selected neighboring sub-block is a left neighbor of the current block.

4. The method of claim 1, wherein a motion vector predictor for each remaining sub-block included in the current block is determined from a motion vector of a respective neighboring sub-block that is selected based on the prediction direction.

5. The method of claim 1, further comprising:
decoding a codeword from the coded bitstream, the codeword indicating the prediction direction.

6. The method of claim 1, further comprising:
decoding, from the coded bitstream, a residual motion vector for the current sub-block; and
combining the motion vector predictor with the residual motion vector to derive a current motion vector for the current sub-block.

7. The method of claim 1, further comprising:
decoding at least one syntax element from the coded bitstream, the at least one syntax element indicating the prediction direction.

8. The method of claim 1, further comprising:
deriving a motion vector for the current sub-block based on refining the motion vector predictor using one of template matching and bilateral matching.

9. The method of claim 1, further comprising:
selecting another neighboring sub-block in the coded picture outside the current block for the current sub-block based on the prediction direction, the reference position being adjacent to another representative position of the other selected neighboring sub-block and the representative position of the selected neighboring sub-block; and
determining the reference motion vector corresponding to the reference position based on the motion vector for coding the selected neighboring sub-block and another motion vector for coding the other selected neighboring sub-block.

10. The method of claim 9, wherein the determining the reference motion vector corresponding to the reference position is performed using a weighted combination of the motion vector for coding the selected neighboring sub-block and the other motion vector for coding the other selected neighboring sub-block.

11. A decoder device, comprising processing circuitry configured to:
select, a neighboring sub-block outside a current block for a current sub-block in the current block based on a prediction direction that indicates a spatial relationship between the current sub-block and the selected neighboring sub-block, the selected neighboring sub-block and the current block being in a coded picture from a coded bitstream, and a representative position of the current sub-block being on a reference line extended along the prediction direction from a reference position that is on or adjacent to a representative position of the selected neighboring sub-block;

determine a reference motion vector corresponding to the reference position based on a motion vector for coding the selected neighboring sub-block;

determine a motion vector predictor for the current sub-block based on the reference motion vector; and decode the current sub-block for output using inter-picture prediction performed based on the motion vector predictor.

12. The decoder device of claim 11, wherein the selected neighboring sub-block and the current sub-block are in a same column of the coded picture, and the selected neighboring sub-block is a top neighbor of the current block.

13. The decoder device of claim 11, wherein the selected neighboring sub-block and the current sub-block are in a same row of the coded picture, and the selected neighboring sub-block is a left neighbor of the current block.

14. The decoder device of claim 11, wherein the processing circuitry is further configured to:
determine a motion vector predictor for each remaining sub-block included in the current block from a motion vector of a respective neighboring sub-block that is selected based on the prediction direction.

15. The decoder device of claim 11, wherein the processing circuitry configured to:
decode a codeword from the coded bitstream, the codeword indicating the prediction direction.

16. The decoder device of claim 11, wherein the processing circuitry is further configured to:
select another neighboring sub-block in the coded picture outside the current block for the current sub-block based on the prediction direction, the reference position being adjacent to another representative position of the other selected neighboring sub-block and the representative position of the selected neighboring sub-block; and
determine the reference motion vector corresponding to the reference position based on the motion vector for coding the selected neighboring sub-block and another motion vector for coding the other selected neighboring sub-block.

17. The decoder device of claim 16, wherein the processing circuitry is further configured to:
determine the reference motion vector corresponding to the reference position using a weighted combination of the motion vector for coding the selected neighboring sub-block and the other motion vector for coding the other selected neighboring sub-block.

18. The decoder device of claim 11, wherein the processing circuitry is further configured to:
decode, from the coded bitstream, a residual motion vector for the current sub-block; and
derive a current motion vector for the current sub-block by combing the motion vector predictor for the current sub-block with the residual motion vector.

19. A non-transitory computer-readable storage medium storing a program executable by at least one processor to perform:
selecting a neighboring sub-block outside a current block for a current sub-block in the current block based on a prediction direction that indicates a spatial relationship between the current sub-block and the selected neighboring sub-block, the selected neighboring sub-block and the current block being in a coded picture from a coded bitstream, and a representative position of the current sub-block being on a reference line extended along the prediction direction from a reference position that is on or adjacent to a representative position of the selected neighboring sub-block;

determining a reference motion vector corresponding to the reference position based on a motion vector for coding the selected neighboring sub-block;

determining a motion vector predictor for the current sub-block based on the reference motion vector; and decoding the current sub-block for output using inter-picture prediction performed based on the motion vector predictor.

20. The method of claim 1, wherein the prediction direction is selected from a group of directions including a vertical prediction direction, a horizontal prediction direction, and a diagonal prediction direction.

21. The non-transitory computer-readable storage medium of claim 19, wherein the prediction direction is selected from a group of directions including a vertical prediction direction, a horizontal prediction direction, and a diagonal prediction direction.

22. The decoder device of claim 11, wherein the prediction direction is selected from a group of directions including a vertical prediction direction, a horizontal prediction direction, and a diagonal prediction direction.

\* \* \* \* \*